(12) United States Patent  
Ogino

(10) Patent No.: US 12,316,817 B2  
(45) Date of Patent: May 27, 2025

(54) IMAGE PROCESSING APPARATUS AND CONTROL METHOD

(71) Applicant: SHARP KABUSHIKI KAISHA, Sakai (JP)

(72) Inventor: Kumiko Ogino, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/431,952

(22) Filed: Feb. 3, 2024

(65) Prior Publication Data

US 2024/0179260 A1    May 30, 2024

Related U.S. Application Data

(63) Continuation of application No. 17/695,057, filed on Mar. 15, 2022, now abandoned.

(30) Foreign Application Priority Data

Mar. 22, 2021    (JP) .................................. 2021-047352

(51) Int. Cl.  
H04N 1/32    (2006.01)  
H04N 1/00    (2006.01)

(52) U.S. Cl.  
CPC ..... *H04N 1/32069* (2013.01); *H04N 1/32101* (2013.01); *H04N 2201/0094* (2013.01)

(58) Field of Classification Search  
None  
See application file for complete search history.

(56) References Cited

U.S. PATENT DOCUMENTS

| | | | |
|---|---|---|---|
| 2002/0044149 A1* | 4/2002 | McCarthy | H04M 1/72448 345/581 |
| 2009/0094254 A1 | 4/2009 | Akita et al. | |
| 2011/0002007 A1 | 1/2011 | Okada | |
| 2015/0007109 A1 | 1/2015 | Yun | |
| 2015/0046975 A1* | 2/2015 | Kato | H04L 63/08 726/3 |
| 2016/0219190 A1* | 7/2016 | Sugiyama | H04L 51/42 |
| 2016/0269573 A1 | 9/2016 | Sugita | |
| 2016/0301824 A1* | 10/2016 | Shibao | H04N 1/00413 |
| 2016/0373607 A1* | 12/2016 | Tsujimoto | H04N 1/00307 |

(Continued)

FOREIGN PATENT DOCUMENTS

| | | | | |
|---|---|---|---|---|
| JP | 2001223869 | * | 8/2001 | ............... H04N 1/32 |
| JP | 2002204325 | * | 7/2002 | ............... H04N 1/00 |

(Continued)

OTHER PUBLICATIONS

Non-Final Rejection of U.S. Appl. No. 17/695,057 issued on Aug. 4, 2022.

(Continued)

*Primary Examiner* — Beniyam Menberu  
(74) *Attorney, Agent, or Firm* — ScienBiziP, P.C.

(57) ABSTRACT

An image processing apparatus includes a first selector that selects one or more first addresses from one or more addresses received from a terminal device by using a short-range wireless communication, a second selector that selects one or more second addresses different from the first addresses, and an image sender that sends an image to the first addresses and the second addresses.

8 Claims, 16 Drawing Sheets

(56) References Cited

U.S. PATENT DOCUMENTS

| | | | |
|---|---|---|---|
| 2017/0171402 A1* | 6/2017 | Yamaguchi | H04N 1/00307 |
| 2017/0374230 A1 | 12/2017 | Song | |
| 2020/0137260 A1 | 4/2020 | Sugawara | |
| 2022/0385784 A1* | 12/2022 | Chiba | H04N 1/00933 |

FOREIGN PATENT DOCUMENTS

| | | | | |
|---|---|---|---|---|
| JP | 2002-281211 A | | 9/2002 | |
| JP | 2002359719 A | | 12/2002 | |
| JP | 2004-040206 A | | 2/2004 | |
| JP | 2004-248034 A | | 9/2004 | |
| JP | 2006-087028 A | | 3/2006 | |
| JP | 2006067192 | * | 3/2006 | H04B 7/26 |
| JP | 2006135570 A | | 5/2006 | |
| JP | 2009253782 | * | 10/2009 | H04M 1/00 |
| JP | 2013239974 A | | 11/2013 | |
| JP | 2016-139937 A | | 8/2016 | |
| JP | 2018173952 | * | 11/2018 | G06F 21/31 |
| JP | 2019029955 A | | 2/2019 | |
| JP | 2019-062349 A | | 4/2019 | |
| JP | 2019-083376 A | | 5/2019 | |
| JP | 2019192127 A | | 10/2019 | |
| KR | 20160020290 A | | 2/2016 | |
| KR | 20170014761 A | | 2/2017 | |

OTHER PUBLICATIONS

Final Rejection of U.S. Appl. No. 17/695,057 issued on Jan. 31, 2023.

Non-Final Rejection of U.S. Appl. No. 17/695,057 issued on May 24, 2023.

Final Rejection of U.S. Appl. No. 17/695,057 issued on Nov. 7, 2023.

* cited by examiner

| NAME | PHONE NUMBER | E-MAIL ADDRESS |
|---|---|---|
| UEO AI | 080-0123-4567 | aiueo@example.com |
| YOSUKE MATSUYAMA | 080-0111-2222 | matsuyama@example.com |
| YOSHINO YAMASHITA | 070-0222-3333 | yamashita@example.com |
| ⋮ | ⋮ | ⋮ |

FIG. 5

| NAME | RUBY TEXT | E-MAIL ADDRESS | FACSIMILE NUMBER |
|---|---|---|---|
| SEIICHI TAKAGI | SEIICHI TAKAGI | takagi@example.com | 03-0123-4567 |
| KEIKO TAKASAKI | KEIKO TAKASAKI | takasaki@example.com | - |
| KOJI TAKADA | KOJI TAKADA | takada@example.com | - |
| ⋮ | ⋮ | ⋮ | ⋮ |

FIG. 6

| DESTINATION | E-MAIL ADDRESS | SENDING DATE AND TIME |
|---|---|---|
| MAKOTO TAKAHASHI | makoto.takahashi@example.com | JAN 15, 2021, 19:02:21 |
| NAOYUKI TAKAHASHI | naoyuki.takahashi@example.com | JAN 15, 2021, 11:03:11 |
| YUKIO TANAKA | yukio.tanaka@example.com | JAN 14, 2021, 17:31:52 |
| ⋮ | ⋮ | ⋮ |

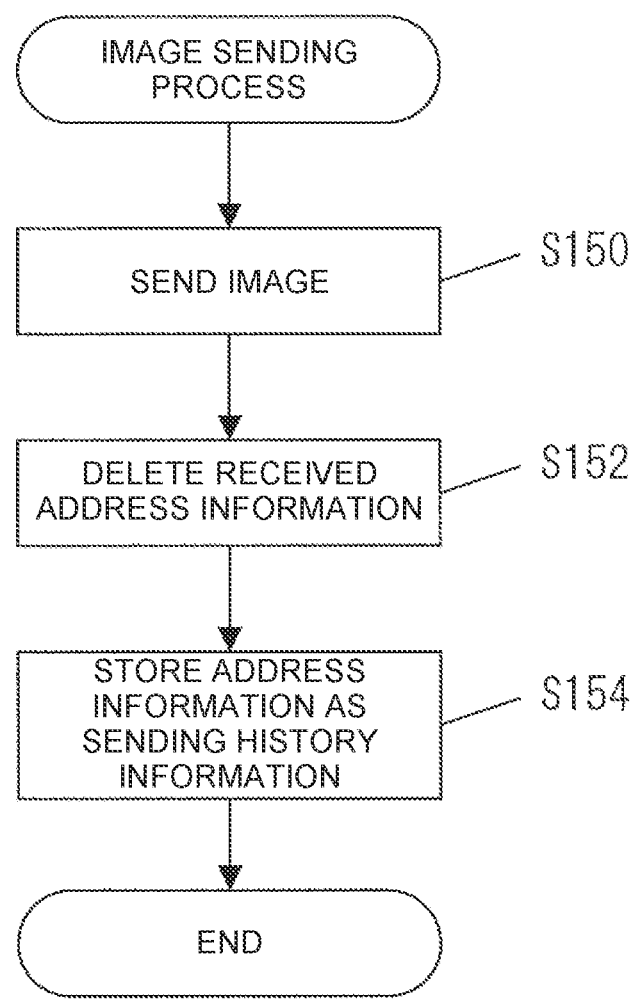

FIG. 14

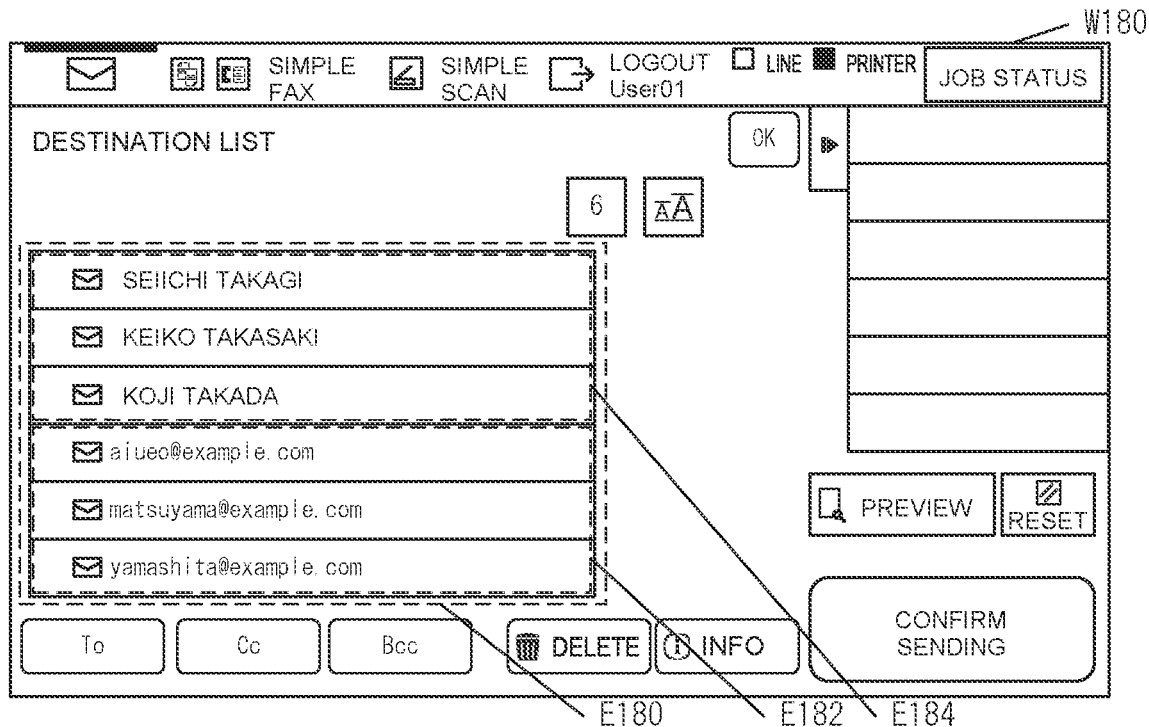

FIG. 15

| LOGIN NAME | DESTINATION | E-MAIL ADDRESS | SENDING DATE AND TIME | TRANSFER FLAG |
|---|---|---|---|---|
| user1 | MAKOTO TAKAHASHI | makoto.takahashi @example.com | JAN 15, 2021, 19:02:21 | Yes |
| user2 | UEO AI | aiueo@example.com | JAN 15, 2021, 17:53:06 | Yes |
| user3 | YOSUKE MATSUYAMA | matsuyama @example.com | JAN 15, 2021, 16:44:11 | Yes |
| user3 | YOSHINO YAMASHITA | yamashita @example.com | JAN 15, 2021, 13:23:26 | Yes |
| user1 | NAOYUKI TAKAHASHI | naoyuki.takahashi @example.com | JAN 15, 2021, 11:03:11 | No |
| user1 | YUKIO TANAKA | yukio.tanaka @example.com | JAN 14, 2021, 17:31:52 | No |
| ⋮ | ⋮ | ⋮ | ⋮ | ⋮ |

IMAGE PROCESSING APPARATUS AND CONTROL METHOD

CROSS-REFERENCE TO RELATED APPLICATIONS

This application is a continuation of U.S. patent application Ser. No. 17/695,057, filed on Mar. 15, 2022, which claims the benefit of priority to Japanese Patent Application Number 2021-047352 filed on Mar. 22, 2021. The entire contents of the above-identified application are hereby incorporated by reference.

BACKGROUND OF THE INVENTION

Field of the Invention

The present disclosure relates to an image processing apparatus and the like.

Description of the Background Art

Conventionally, digital multi-function peripherals (multi-function peripherals/printers (MFPs)) having a copy function, a print function, a scanner function, an e-mail sending function, and the like, are widely used. Some multi-function peripherals have a function to send the image of a document scanned by a scanner function to a destination designated by a user.

There is also a disclosed technique for acquiring destination information from other devices. For example, there is a disclosed image processing apparatus that acquires destination information from a mobile terminal and, based on the acquired destination information, switches an image processing function to be executed and specifies the settings for the image processing function (see, for example, Japanese Unexamined Patent Application Publication No. 2019-062349).

Japanese Unexamined Patent Application Publication No. 2019-062349 discloses that the image processing apparatus may use a destination included in the destination information received from the mobile terminal as a destination (sending destination) of the image data. Unfortunately, the image processing apparatus according to Japanese Unexamined Patent Application Publication No. 2019-062349 has an issue that the destination is designable only from the destination information received from the mobile terminal.

In view of the above-described issue, the present disclosure has an object to provide an image processing apparatus and the like that may flexibly select a destination.

SUMMARY OF THE INVENTION

In order to solve the above-described issue, an image processing apparatus according to the present disclosure includes a first selector that selects one or more first addresses from one or more addresses received from a terminal device by using a short-range wireless communication, a second selector that selects one or more second addresses different from the first addresses, and an image sender that sends an image to the first addresses and the second addresses.

A control method according to the present disclosure includes first selecting of selecting one or more first addresses from one or more addresses received from a terminal device by using a short-range wireless communication, second selecting of selecting one or more second addresses different from the first addresses, and sending an image to the first addresses and the second addresses.

According to the present disclosure, it is possible to provide an image processing apparatus and the like that may flexibly select a destination.

BRIEF DESCRIPTION OF THE DRAWINGS

FIG. 5 is a table illustrating an example of a data structure of address information stored in the image processing apparatus according to the first embodiment.

FIG. 6 is a table illustrating an example of a data structure of sending history information according to the first embodiment.

FIG. 9 is a flowchart illustrating a flow of an image sending process according to the first embodiment.

FIG. 14 is a diagram illustrating an operation example according to the first embodiment.

FIG. 15 is a table illustrating an example of a data structure of sending history information according to a third embodiment.

DESCRIPTION OF THE PREFERRED EMBODIMENTS

An embodiment for carrying out the present disclosure will be described below with reference to the drawings. The embodiment below is an example for describing the present disclosure, and the technical scope of the invention set forth in the claims is not limited to the description below.

1. First Embodiment

1.1 Overall Configuration

Figure 1:
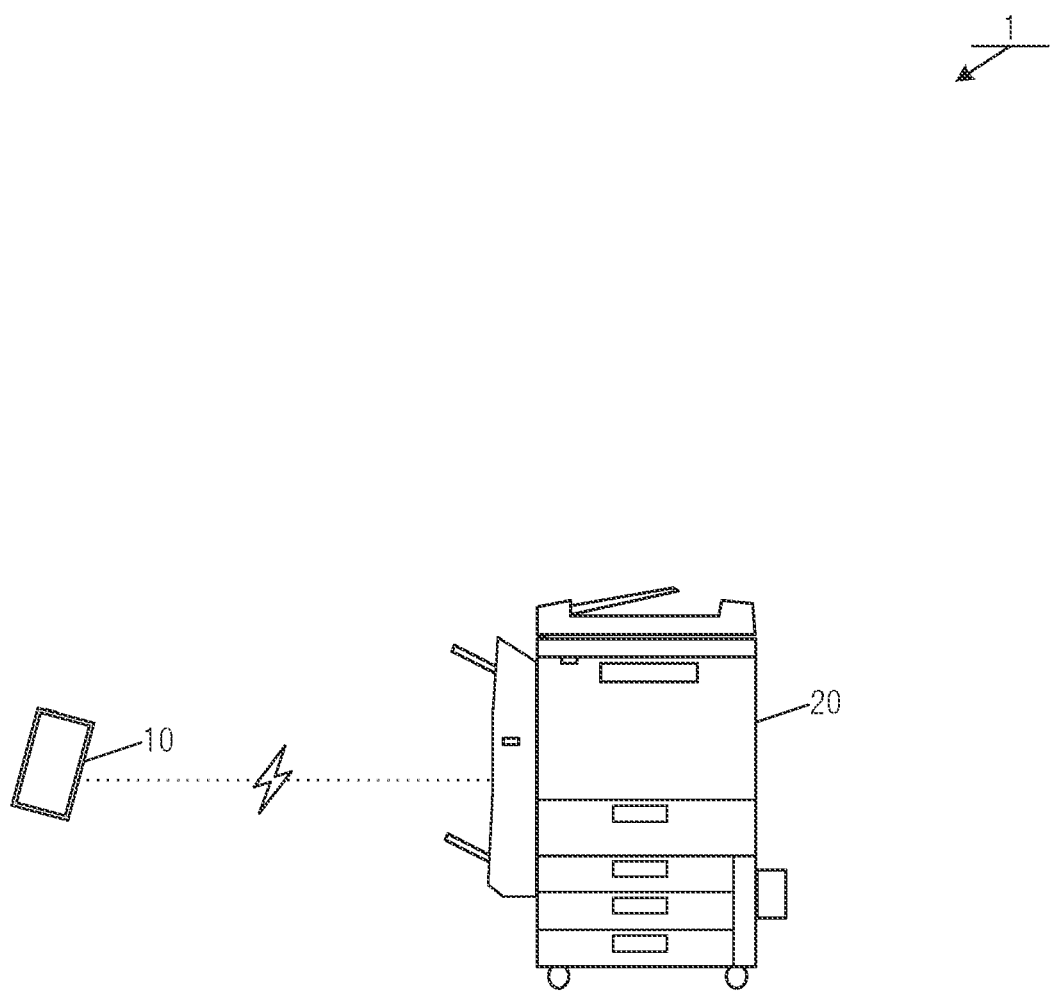
FIG. 1 is a diagram illustrating an overall configuration of a system according to a first embodiment.

With reference to FIG. 1, a system 1 according to the present embodiment will be described. The system 1 according to the present embodiment includes a terminal device 10 and an image processing apparatus 20 as illustrated in FIG. 1. The terminal device 10 and the image processing apparatus 20 have a function to perform a short-range wireless communication.

The terminal device 10 is an information processing device carried by a user. The terminal device 10 is a device such as a smartphone or tablet. The terminal device 10 may also be a device such as a smartwatch, a personal computer (PC), or a personal digital assistant (PDA).

The image processing apparatus 20 is an apparatus having a copy function, a print function, a scanner function, an e-mail sending function, and the like, and is an apparatus typically called a digital multi-function peripheral (MFP). The image processing apparatus 20 may also be an image-forming apparatus including a device that forms images on a recording sheet such as paper or OHP film by using a system such as an electrophotographic system.

1.2 Functional Configuration 1.2.1 Terminal Device

Figures 2, 3:
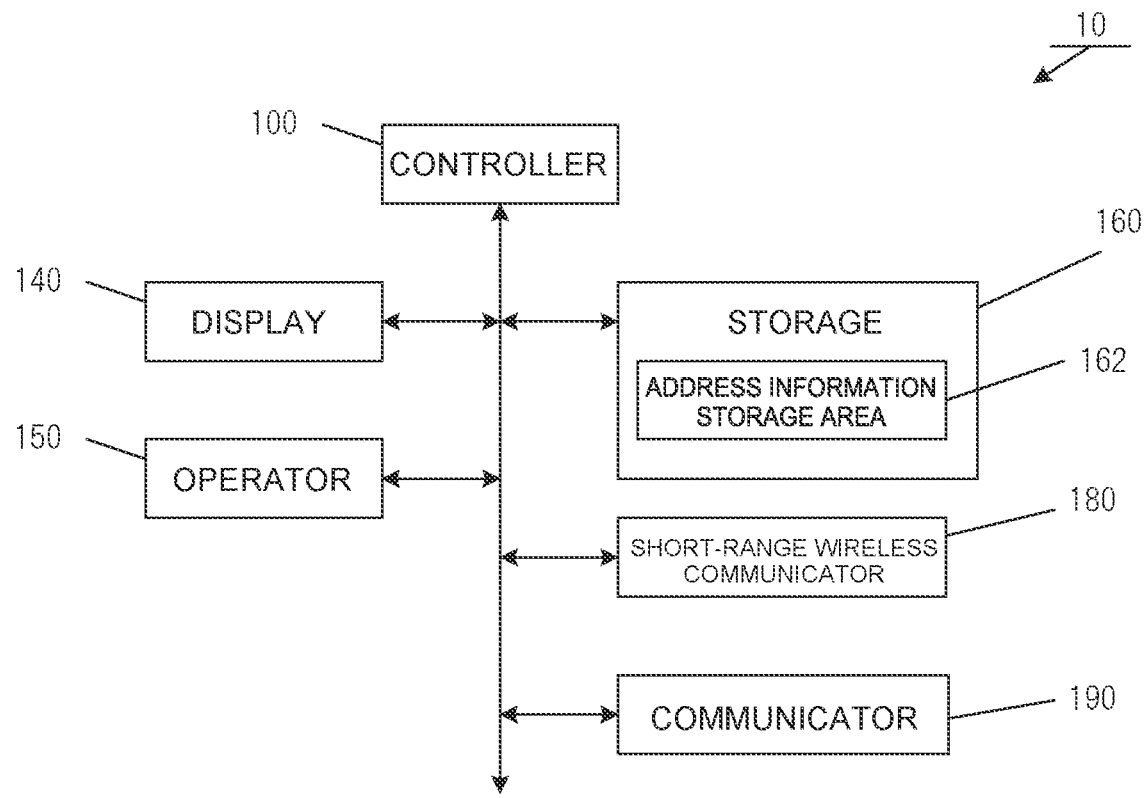
FIG. 2 is a diagram illustrating a functional configuration of a terminal device according to the first embodiment.
FIG. 3 is a table illustrating an example of a data structure of address information stored in the terminal device according to the first embodiment.

A configuration of the terminal device 10 according to the present embodiment will be described with reference to FIG. 2. As illustrated in FIG. 2, the terminal device 10 includes a controller 100, a display 140, an operator 150, a storage 160, a short-range wireless communicator 180, and a communicator 190.

The controller 100 controls the entire terminal device 10. The controller 100 reads and executes various programs stored in the storage 160 to perform various functions and includes one or more computing devices (e.g., central processing units (CPUs)).

The display 140 presents various types of information. The display 140 includes a display device such as a liquid crystal display (LCD), an organic electro-luminescence (EL) panel, or a micro light emitting diode (LED) display.

The operator 150 receives an operation from a user using the terminal device 10. The operator 150 includes an input device such as a touch sensor. The method for detecting an input with the touch sensor may be any typical detection method such as a resistive method, an infrared method, an inductive method, or a capacitive method. The terminal device 10 may also include a touch panel having an integrated combination of the display 140 and the operator 150.

The storage 160 stores various types of programs and data needed for operations of the terminal device 10. The storage 160 includes, for example, a storage device such as a solid state drive (SSD) which is a semiconductor memory and a hard disk drive (HDD).

The storage 160 reserves an address information storage area 162 as a storage area. The address information storage area 162 stores information (address information) about the user's contact information (e.g., telephone number and e-mail address). The address information stored in the terminal device 10 is typically the information displayed by a function called an address book or telephone book.

FIG. 3 illustrates an example of a data structure of the address information stored in the address information storage area 162. As illustrated in FIG. 3, the address information stored in the address information storage area 162 stores the name (e.g., "Ueo Ai") of the user, the telephone number (e.g., "080-0123-4567") of the user, and the e-mail address (e.g., "aiuco@example.com") of the user.

The address information stored in the terminal device 10 may also store a plurality of telephone numbers and e-mail addresses corresponding to the name of one user. In addition to the information described above, the address information stored in the terminal device 10 may also store information such as a ruby text of the name, a facsimile number, an address, a company name, a department name, a category, and a memo.

The short-range wireless communicator 180 performs a wireless communication with other devices located around the terminal device 10. The short-range wireless communicator 180 includes, for example, a communication device including an antenna. The wireless communication method used by the short-range wireless communicator 180 may be any method as long as it is a wireless communication method typically used for short-range communications, e.g., Bluetooth (registered trademark), Near Field Communication (NFC), ZigBee (registered trademark), and wireless USB.

The communicator 190 communicates with an external device. The communicator 190 includes, for example, a Network Interface Card (NIC) used in a wired/wireless local area network (LAN) or a communication module connectable to Long Term Evolution (LTE)/LTE-Advanced (LTE-A)/License-Assisted Access using LTE (LAA)/5G lines.

1.2.2 Image Processing Apparatus

Figure 4:
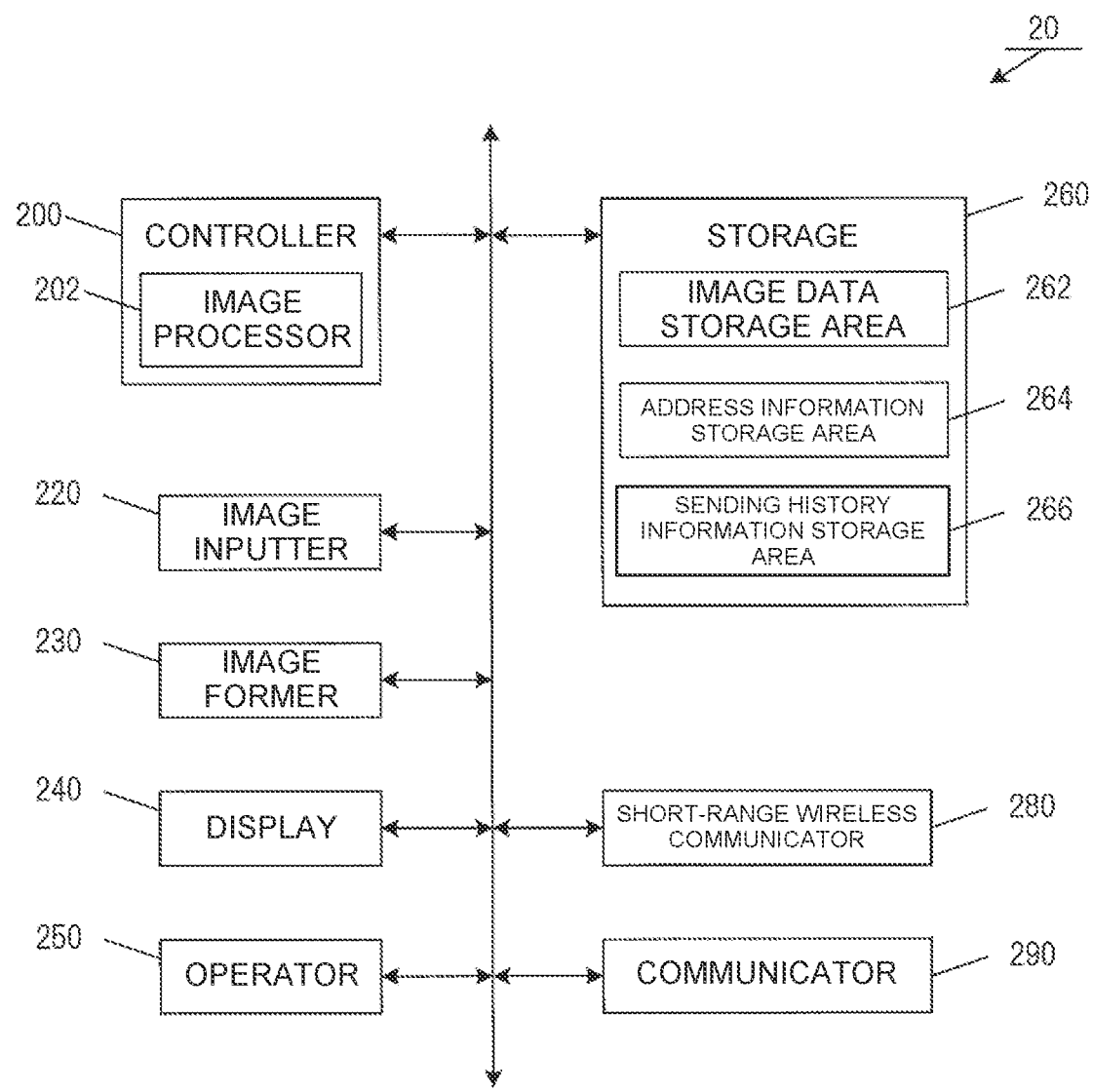
FIG. 4 is a diagram illustrating a functional configuration of an image processing apparatus according to the first embodiment.

A configuration of the image processing apparatus 20 according to the present embodiment will be described with reference to FIG. 4. As illustrated in FIG. 4, the image processing apparatus 20 includes a controller 200, an image inputter 220, an image former 230, a display 240, an operator 250, a storage 260, a short-range wireless communicator 280, and a communicator 290.

The controller 200 controls the entire image processing apparatus 20. The controller 200 reads and executes various programs stored in the storage 260 to perform various functions and includes one or more computing devices (e.g., CPUs).

The image inputter 220 reads a document and inputs the data on the read image. For example, the image inputter 220 includes a scan device, or the like, which includes a device that converts optical information into electrical signals, e.g., a contact image sensor (CIS) or charge coupled device (CCD), to read the document placed on a placement table of the image processing apparatus 20. The image inputter 220 may also include an interface (terminal) to read out an image stored in a Universal Serial Bus (USB) memory.

The image former 230 forms (prints) an image on a recording medium such as recording paper. The image former 230 includes, for example, a laser printer, or the like, using an electrophotographic system.

The display 240 presents various types of information. The display 240 includes a display device such as an LCD, an organic EL panel, a micro LED display.

The operator 250 receives operations from a user using the image processing apparatus 20. The operator 250 includes an input device such as a hardware key (physical key or numeric keypad) and a touch sensor. The method for detecting an input with the touch sensor may be any typical detection method such as a resistive method, an infrared method, an inductive method, or a capacitive method. The image processing apparatus 20 may also include a touch panel having an integrated combination of the display 240 and the operator 250.

The storage 260 stores various types of programs and data needed for operations of the image processing apparatus 20. The storage 260 includes, for example, a storage device such as an SSD which is a semiconductor memory and an HDD.

The storage 260 reserves, as storage areas, an image data storage area 262, an address information storage area 264, and a sending history information storage area 266.

The image data storage area 262 stores the image data on an image input by the image inputter 220. The image data may be, for example, data (print data) representing an image to be formed by the image former 230 or a format of file readable by other devices.

The address information storage area 264 stores information (address information) about the user's contact information (e.g., telephone number and e-mail address). The address information stored in the image processing apparatus 20 is typically the information displayed by a function called an address book or telephone book.

FIG. 5 illustrates an example of a data structure of the address information stored in the address information storage area 264. As illustrated in FIG. 5, the address information stored in the address information storage area 264 stores the name (e.g., "Seiichi Takagi") of a user, the ruby text (e.g., "Seiichi Takagi") of the name, the e-mail address (e.g., "takagi@example.com") of the user, and the facsimile number (e.g., "03-0123-4567") indicating the number of the facsimile sending destination.

The address information stored in the image processing apparatus 20 may also store a plurality of e-mail addresses and facsimile numbers corresponding to the name of one user. In addition to the information described above, the address information stored in the image processing apparatus 20 may also store information such as an address, a company name, a department name, a category, and a memo.

The sending history information storage area 266 stores the history information (sending history information) when an image is sent from the image processing apparatus 20. FIG. 6 illustrates an example of a data structure of the sending history information stored in the sending history information storage area 266. As illustrated in FIG. 6, the sending history information stored in the sending history information storage area 266 stores the destination (e.g., "Makoto Takahashi") indicating the name of the user to which the image is sent, the e-mail address (e.g., "makoto.takahashi@example.com") of the user, and the sending date and time of the image (e.g., "Jan. 15, 2021, 19:02:21").

The short-range wireless communicator 280 performs a wireless communication with other devices located around the image processing apparatus 20. The short-range wireless communicator 280 includes, for example, a communication device including an antenna. The wireless communication method used by the short-range wireless communicator 280 may be any method as long as it is a wireless communication method typically used for short-range communications, e.g., Bluetooth (registered trademark), NFC, ZigBee (registered trademark), and wireless USB.

The communicator 290 communicates with an external device via a LAN or WAN. The communicator 290 includes, for example, a communication device such as an NIC used in a wired/wireless LAN and a communication module.

1.3 Process Flow 1.3.1 Process Flow of Terminal Device and Image Processing Apparatus Next, a process flow according to the present embodiment will be described. First, with reference to FIG. 7, a process and communicated information of the terminal device 10 and the image processing apparatus 20 will be described.

First, the controller 200 of the image processing apparatus 20 determines whether the user has selected an image sending function (S1000). The image sending function is, for example, a function (Scan To Email function) to use an e-mail to send the image data generated when the image inputter 220 scans a document.

When the image sending function has been selected, the controller 200 acquires the image via the image inputter 220 (S1000; Yes→S1002). The controller 200 may also store the image data on the image acquired at S1002 in the image data storage area 262. When a function other than the image sending function has been selected at S1000, the controller 200 executes a predetermined process corresponding to the selected function (S1000; No).

Subsequently, the controller 200 determines whether the operation has been performed to receive the address information from the terminal device 10 (S1004). The operation to receive the address information from the terminal device 10 is, for example, the operation to press the button indicating "view the telephone book of the external device" presented on the display 240.

When the operation has been performed to receive the address information from the terminal device 10, the terminal device 10 and the image processing apparatus 20 execute pairing to enable a short-range wireless communication between the terminal device 10 and the image processing apparatus 20 (S1004; Yes→S1006).

After pairing is completed, the controller 100 of the terminal device 10 detects that the user has input an address information sending operation via the operator 150 (S1008). Further, the controller 100 performs a short-range wireless communication with the image processing apparatus 20 to send (transfer) the address information stored in the address information storage area 162 to the image processing apparatus 20 (S1010).

For example, the controller 100 uses a Bluetooth profile such as Object Push Profile (OPP) or Phone Book Access Profile (PBAP) to collectively send all the address information stored in the address information storage area 162 to the image processing apparatus 20. This allows the controller 100 to send the address information to the image processing apparatus 20 without using a specific application (app). The controller 100 may also send the address information to the image processing apparatus 20 by using a specific app having the function to send address information to the image processing apparatus 20. When a specific app is used, the address information sending operation may also be input on the specific app.

Subsequently, the controller 200 of the image processing apparatus 20 receives the address information sent from the terminal device 10 via the short-range wireless communicator 280 by using a short-range wireless communication (S1012).

Subsequently, the controller 200 of the image processing apparatus 20 performs an address selection process to select a destination to which the image acquired at S1002 is to be sent (S1014). Furthermore, the controller 200 performs a sending process to send the image to the destination selected at S1014 (S1016). The process flows of the address selection process and the sending process will be described below.

When a selection has been made not to acquire the address from the terminal device 10 at S1004, the controller 200 of the image processing apparatus 20 does not acquire the address information from the terminal device 10 but sends the image to a predetermined destination (S1004; No). In this case, the address that is the image sending destination may also be, for example, an e-mail address stored in the address information stored in the address information storage area 264 or an address directly input by the user.

1.3.2 Address Selection Process

The address selection process will be described with reference to FIG. 8. First, the controller 200 temporarily stores the address information received from the terminal device 10 in the storage 260 separately from the address information storage area 264 (Step S100) (an address storage).

Subsequently, the controller 200 displays the address information stored at Step S100 on the display 240 (Step S102). For example, the controller 200 displays the information of the name and the e-mail address included in the address information in list form on the display 240.

Subsequently, the controller 200 selects one or more destinations (first addresses), to which the image data is to be sent, based on the user operation from the stored address information received from the terminal device 10 at Step S100 (Step S104) (a first selector). For example, the controller 200 selects all of the e-mail addresses included in the address information displayed in list form at Step S102 as addresses indicating the image sending destinations. The controller 200 may select, as the address indicating the image sending destination, the e-mail address included in the address information selected by the user from the address information displayed in list form at Step S102. According to the present embodiment, one or more destinations (addresses) selected based on the stored address information received from the terminal device 10 are also referred to as a first address group.

Subsequently, the controller 100 displays the address information (registered address information) previously stored in the address information storage area 264 on the display 240 (Step S106). For example, the controller 200 displays the information of the name and the e-mail address included in the address information in list form on the display 240.

Subsequently, the controller 200 additionally selects one or more destinations (second addresses) different from the destinations based on the stored address information received from the terminal device 10 at Step S100 (a second selector). According to the present embodiment, one or more destinations (addresses) different from the destinations based on the address information received from the terminal device 10 are also referred to as a second address group.

First, the controller 200 determines whether the user has selected one or more sets of address information from the registered address information (Step S108). For example, the controller 200 determines that the address information has been selected when the user has performed the operation to select one or more sets of address information from the address information displayed in list form at Step S106.

When it is determined that the address information has been selected, the controller 200 additionally selects the address selected at Step S108 (Step S108; Yes→Step S110) (the second selector). For example, the controller 200 adds the e-mail address included in the address information selected by the user at Step S108 to the address selected at Step S104. Thus, the controller 200 may select the address selected at Step S104 and the address selected at Step S108 as the destination addresses to which the image is to be sent.

Conversely, when it is determined that the address information has not been selected at Step S108, the controller 200 determines whether a global address book is to be displayed (Step S108; No→Step S112). The global address book is a screen for displaying global address information. The global address information is the address information shared by the organization that owns the image processing apparatus 20 or the facility where the image processing apparatus 20 is set up. For example, the controller 200 determines that the global address book is to be displayed when the operation has been performed to display the global address information (for example, when the user has selected a button for displaying the global address book).

When the global address information is to be displayed, the controller 200 acquires the global address information and displays the acquired global address information on the display 240 (Step S112; Yes→Step S114). For example, the controller 200 connects to a server device that manages the global address information or a service (e.g., a directory service or a service that manages a destination provided on a cloud) via the communicator 290. Then, the controller 200 acquires the address information managed as the global address information from the connected server device or service. The controller 200 displays the information of the name and the e-mail address included in the acquired address information on the display 240 in list form.

Subsequently, it is determined whether one or more sets of the global address information has been selected from the global address information displayed at Step S114 (Step S116).

When it is determined that the global address information has been selected at Step S116, the controller 200 additionally selects the address selected at Step S116 (Step S116; Yes→Step S118) (the second selector). The process at Step S118 is the same as the process at Step S110.

Conversely, when it is determined that the global address information is not to be displayed at Step S112, the controller 200 determines whether the user has directly input the address (Step S112; No→Step S120). For example, the controller 200 determines that the address has been directly input when the operation has been performed to directly input the address (for example, when the user has input the address in a predetermined input area and selected an "OK" button).

When it is determined that the address has been directly input, the controller 200 additionally selects the address input at Step S120 (Step S120; Yes→Step S122) (the second selector). The process at Step S122 is the same as the process at Step S110.

When it is determined at Step S120 that the user has not directly input the address, the controller 200 returns to Step S108 (Step S120; No→Step S108).

Subsequently, the controller 200 determines whether the user has performed the operation to start image sending (Step S124). For example, when the user has selected a button for sending an image, the controller 200 determines that the operation has been performed to start image sending.

When it is determined that the user has performed the operation (sending instruction) to start image sending, the controller 200 ends the address selection process (Step S124; Yes). Conversely, when it is determined that the user has not performed the operation to start image sending, the controller 200 returns to Step S102 (Step S124; No→Step S102). This allows the controller 200 to add, for the user, addresses based on the address information transferred from the terminal device 10 and the address information previously stored in the image processing apparatus 20, the address based on the global address information, and the directly input address.

Before performing the process at Step S124, the controller 200 may also display a list of the addresses selected at Steps S104, S110, S118, and S122 on the display 240. This allows the user to check the destination addresses to which the image is to be sent, i.e., the addresses based on the address information transferred from the terminal device 10 to the image processing apparatus 20 or the address information previously stored in the image processing apparatus 20. Furthermore, the controller 200 may also delete an address from the displayed list of addresses based on the user operation. Thus, the controller 200 allows the user to delete an address that has already been added as the image sending destination.

When it is detected at Step S124 that an operation (e.g., the operation for returning to the home screen or the operation for changing the settings) other than the operation for starting image sending has been performed, the controller 200 performs the process corresponding to the detected operation.

1.3.3 Sending Process

Next, the image sending process will be described with reference to FIG. 9. The image sending process is performed after the user performs the operation (sending instruction) to start image sending at Step S124.

Figure 7:
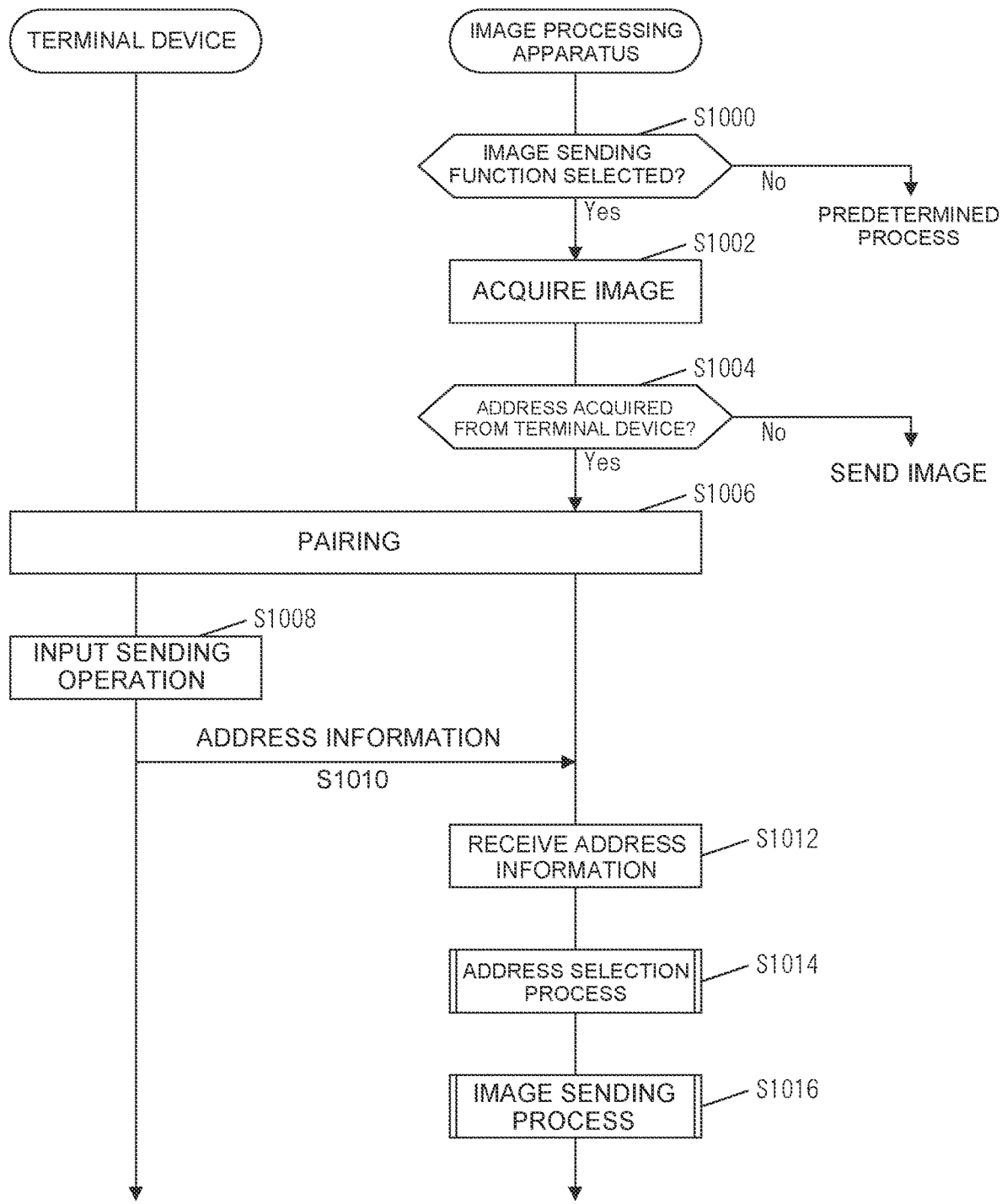
FIG. 7 is a sequence diagram illustrating a flow of a process performed by the terminal device and the image processing apparatus according to the first embodiment.

First, the controller 200 executes a job to send the image acquired at S1002 of FIG. 7 to the address selected during the address selection process (Step S150) (an image sender). For example, the controller 200 generates an e-mail with the image data on the image acquired at S1002 of FIG. 7 attached thereto to the e-mail addresses selected at Steps S104, S110, S118, and S122 of FIG. 8 as destinations. Then, the controller 200 sends the generated e-mail via the communicator 290.

Subsequently, the controller 200 deletes the address information stored at Step S100 of FIG. 8 (the address information received from the terminal device 10) from the storage 260 (Step S152) (an address deleter). Accordingly, the image processing apparatus 20 no longer holds the address information received from the terminal device 10.

Subsequently, the controller 200 stores, as the sending history information, the addresses selected at Steps S104, S110, and S118 and the address (e.g., e-mail address) input at Step S122 of FIG. 8 (Step S154) (a history information storage).

Figure 8:
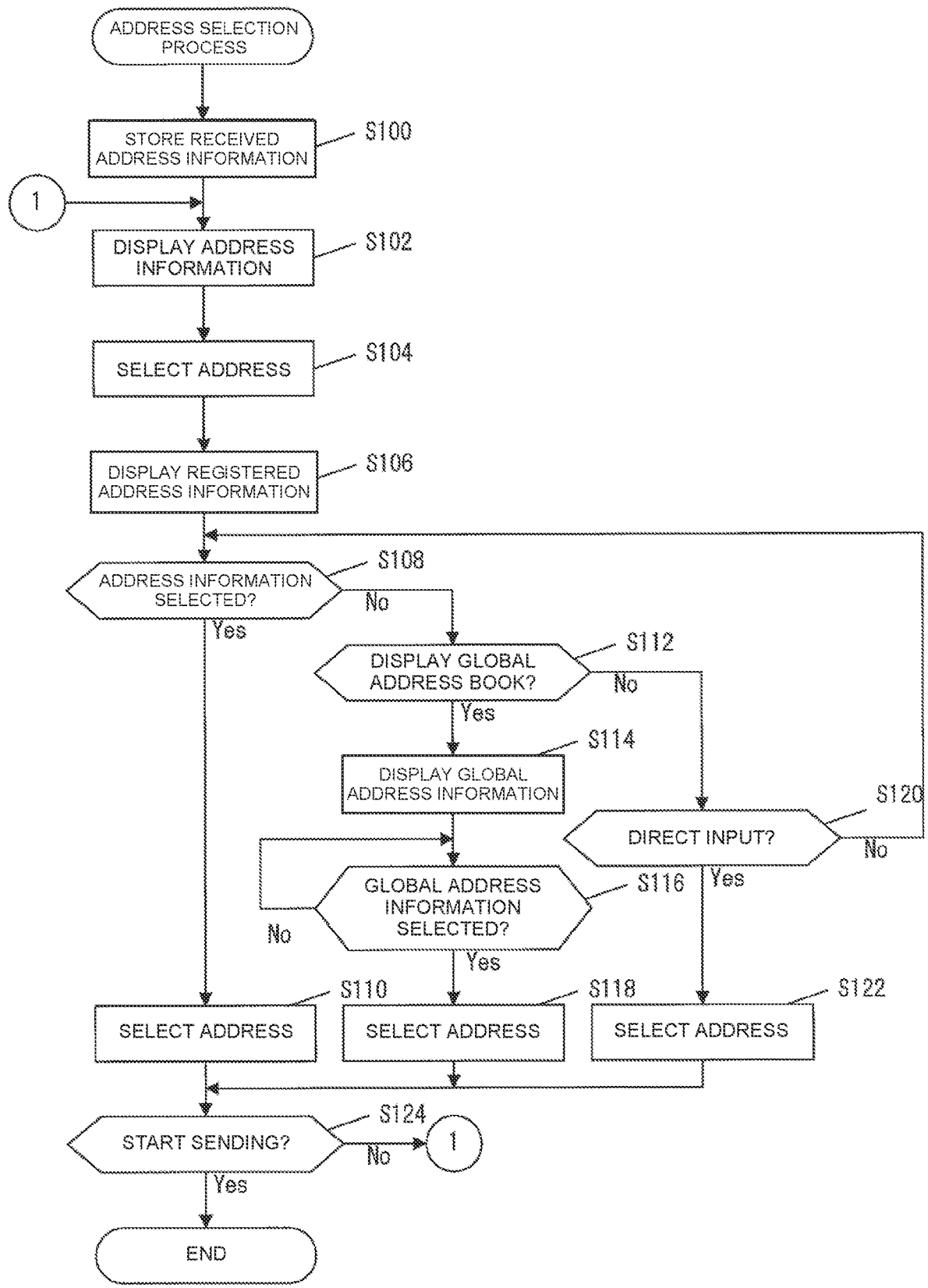
FIG. 8 is a flowchart illustrating a flow of an address selection process according to the first embodiment.

For example, the controller 200 generates the sending history information including the names and the e-mail addresses included in the address information selected at Steps S104, S110, and S118 of FIG. 8 and the sending date and time of the image as the destination, the e-mail address, and the sending date and time. Alternatively, the controller 200 generates the sending history information that includes the e-mail address input at Step S122 and the sending date and time of the image as the e-mail address and the sending date and time and that does not include specific information as the destination. Then, the controller 200 stores the generated sending history information in the sending history information storage area 266.

By the above-described process, the address information received from the terminal device 10 is not stored in the address information storage area 264 of the image processing apparatus 20. On the other hand, among the address information received from the terminal device 10, the address included in the address information selected as the image sending destination is stored as the sending history information in the storage 260 (the sending history information storage area 266) of the image processing apparatus 20. At Step S154, the controller 100 may also perform the process not to store the sending history information regarding the address information received from the terminal device 10 in the sending history information storage area 266. In this case, the address information received from the terminal device 10 is not stored in the storage 260 of the image processing apparatus 20 at all.

In the above description, it is assumed that the controller 200 deletes the address information received from the terminal device 10 after the image is sent, but the timing for deleting the address information received from the terminal device 10 may be different from the timing described above. For example, the controller 200 may also delete the address information received from the terminal device 10 when the instruction is given to start the image sending job or may also delete the address information received from the terminal device 10 before or while the image is sent.

1.4 Operation Example

Figure 10A:
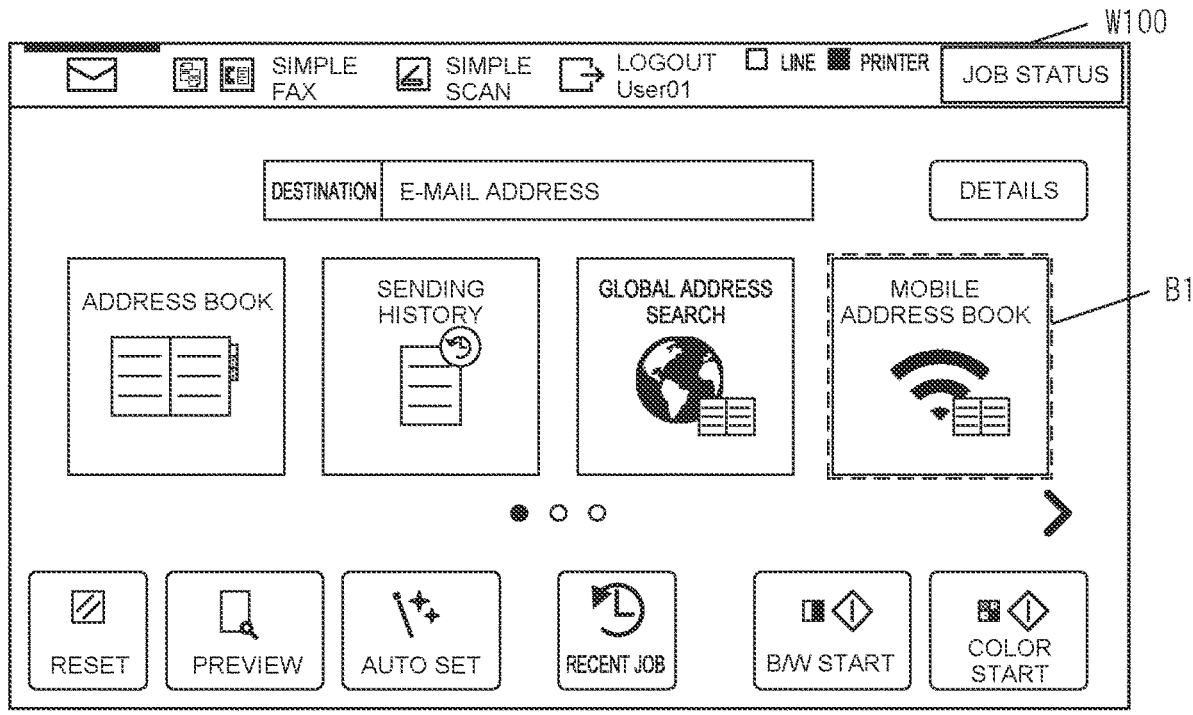
FIGS. 10A and 10B are diagrams illustrating an operation example according to the first embodiment.
Figure 10B:
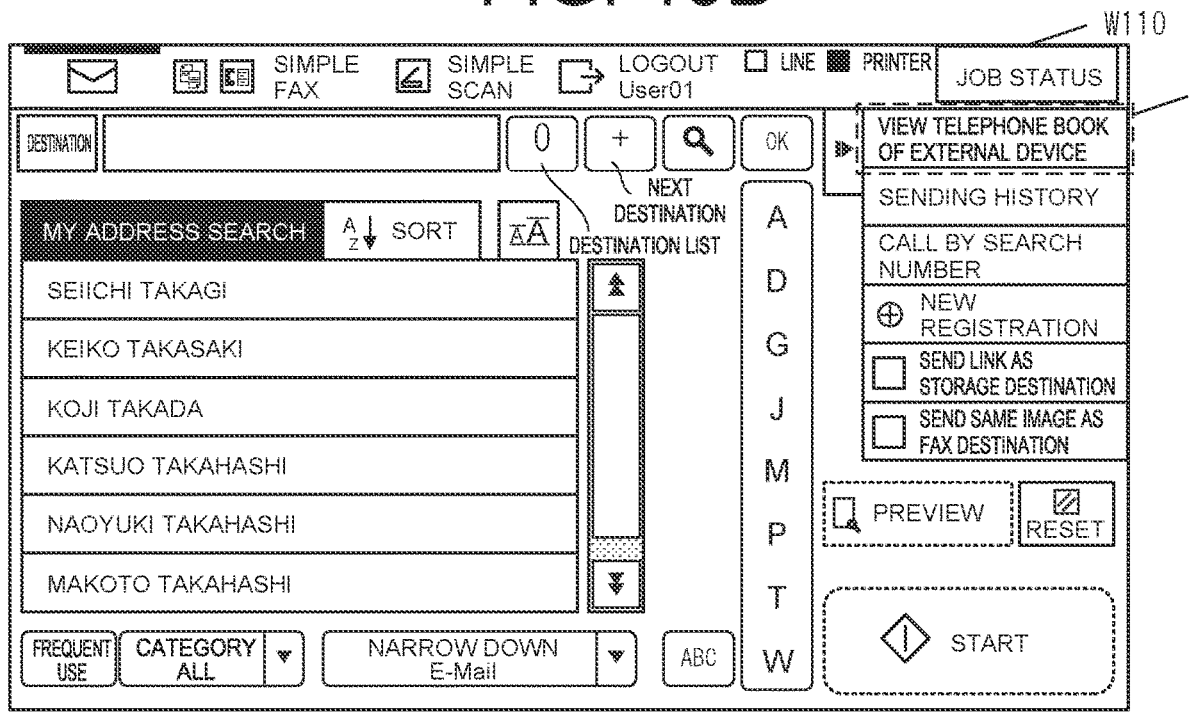

Next, an operation example according to the present embodiment will be described with reference to FIGS. 10A to 14. FIGS. 10A and 10B are display examples of the display screen presented on the display 240 when the image sending function is selected.

A display screen W100 illustrated in FIG. 10A is a screen for the function called "simple scan" included in the image sending function and has the limited content to be set by the user. The user selects (presses) a button B100 indicating "view the telephone book of the external device" so as to use the address information stored in the terminal device 10 used by the user in the image processing apparatus 20.

A display screen W110 illustrated in FIG. 10B is a screen for a mode (e-mail mode) to execute a Scan To Email function. In particular, the display screen W110 is a screen when the address book stored in a main body of the image processing apparatus 20 is opened on a basic screen of the e-mail mode. The user may set the image sending destination via the display screen W110. Further, the user selects (presses) a button B110 indicating "view the telephone book of the external device" so as to use the address information stored in the terminal device 10 used by the user in the image processing apparatus 20, too.

Figure 11A:
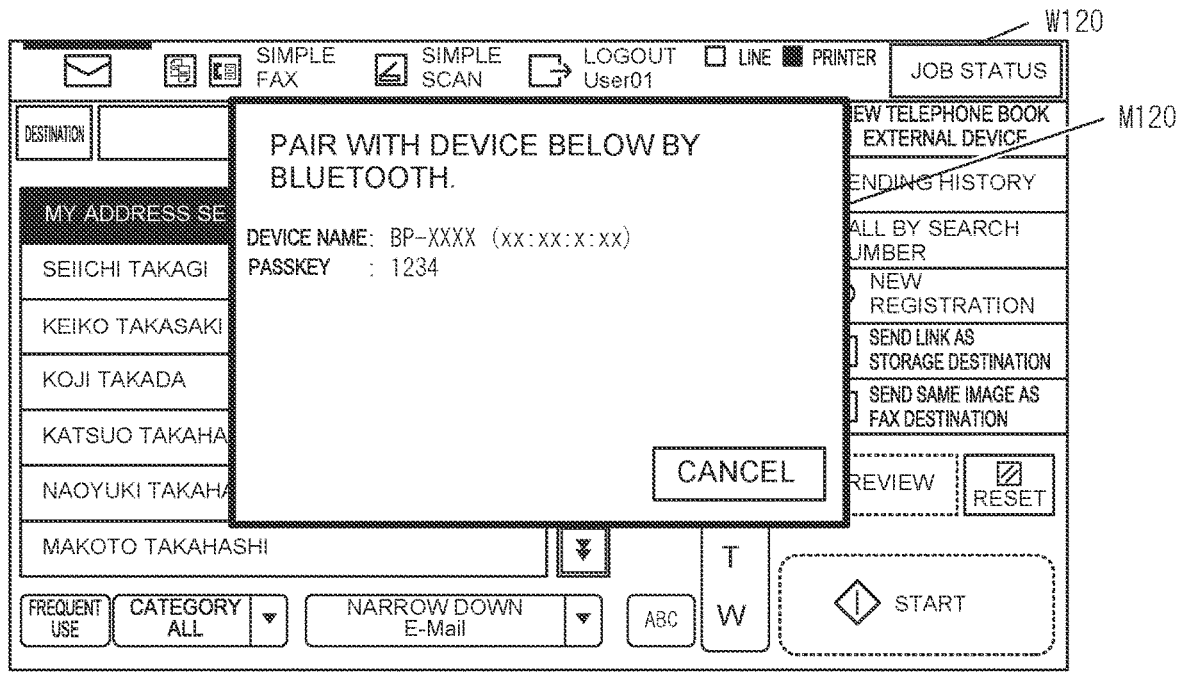
FIGS. 11A and 11B are diagrams illustrating an operation example according to the first embodiment.

When the button B100 in FIG. 10A or the button B110 in FIG. 10B is selected, the display 240 of the image processing apparatus 20 displays a screen for acquiring the address information from the terminal device 10. Here, FIG. 11A is a diagram illustrating a display screen displayed on the display 240 of the image processing apparatus 20 when the user selects the button B110 in FIG. 10B. FIG. 11A illustrates an example of a display screen W120 that is displayed on the display 240 when the button B110 in FIG. 10B is selected. As illustrated in FIG. 11A, the display screen W120 is a screen displaying, on the display screen W110, a dialog message M120 prompting the user to execute pairing with the terminal device 10. The user pairs the terminal device 10 with the image processing apparatus 20 while referring to the dialog message M120.

Figure 11B:
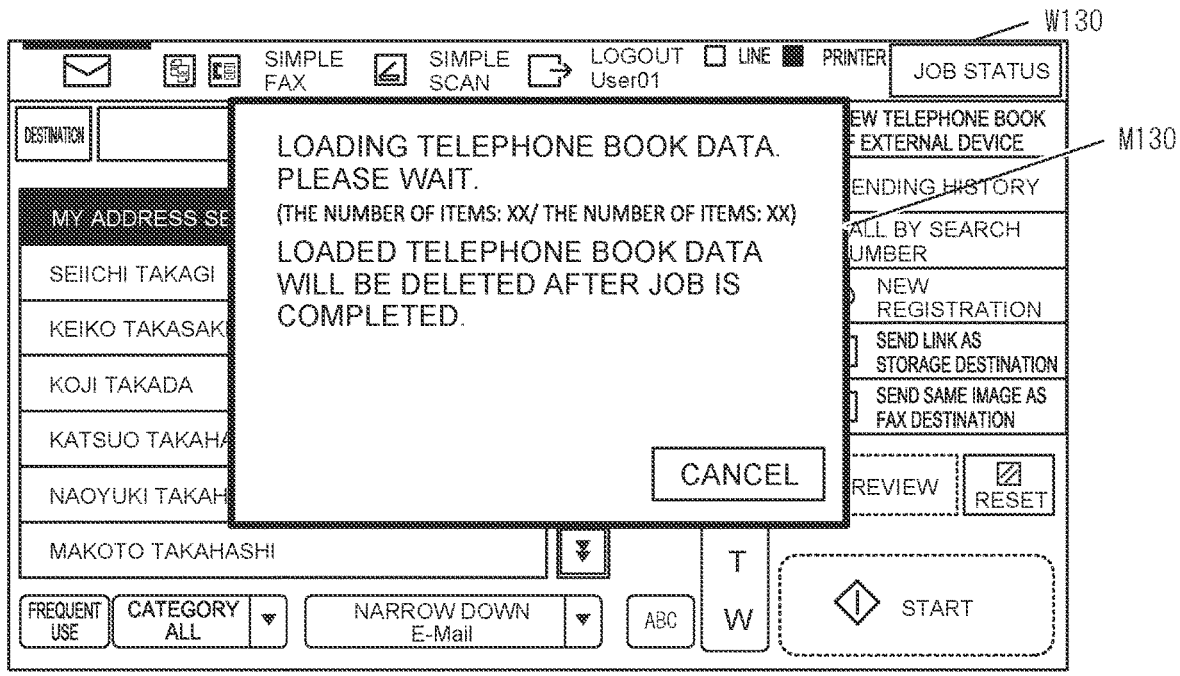

FIG. 11B illustrates an example of a display screen W130 that is displayed on the display 240 after the pairing is completed. As illustrated in FIG. 11B, the display screen W130 displays a dialog message M130 indicating that the address information (telephone book data) stored in the terminal device 10 is being loaded.

Figure 12A:
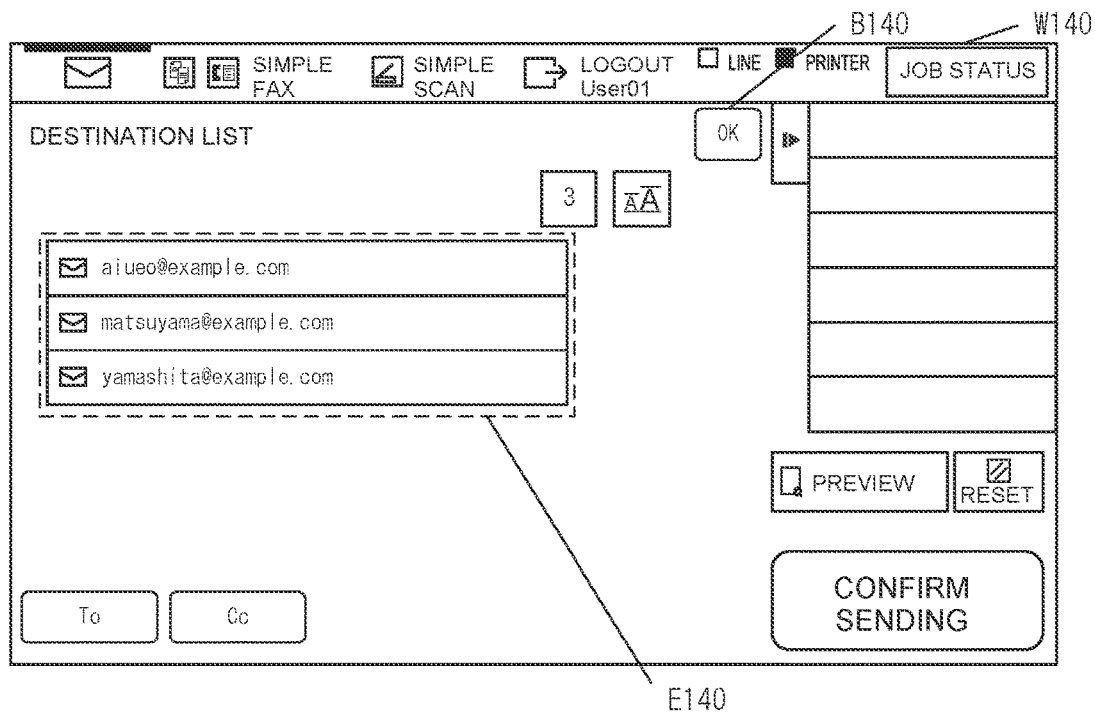
FIGS. 12A and 12B are diagrams illustrating an operation example according to the first embodiment.

FIG. 12A illustrates an example of a display screen W140 displayed on the display 240 after the address information is received from the terminal device 10. The display screen W140 is a destination list screen displaying a list of image sending destinations. The display screen W140 includes a list E140 displaying the address information selected as the image sending destination.

The list E140 displays the address information transferred from the terminal device 10. In the example of FIG. 12A, three sets of address information transferred from the terminal device 10 are displayed in list form.

As described above, in the image processing apparatus 20, the display screen W140 displays a list of address information (destinations) transferred from the terminal device 10 so that a desired destination may be selected from the list.

According to the present embodiment, it is assumed that all the e-mail addresses stored in the address information transferred from the terminal device 10 are selected (set) as the image sending destinations.

The display screen W140 includes a button B140 to close the display screen W140. When the user selects the button B140, the display 240 displays a display screen W150 illustrated in FIG. 12B. The display screen W150 is a screen displaying the address information previously stored in the image processing apparatus 20. That is, the display screen W150 is the screen of the address book stored in the image processing apparatus 20.

Figure 12B:
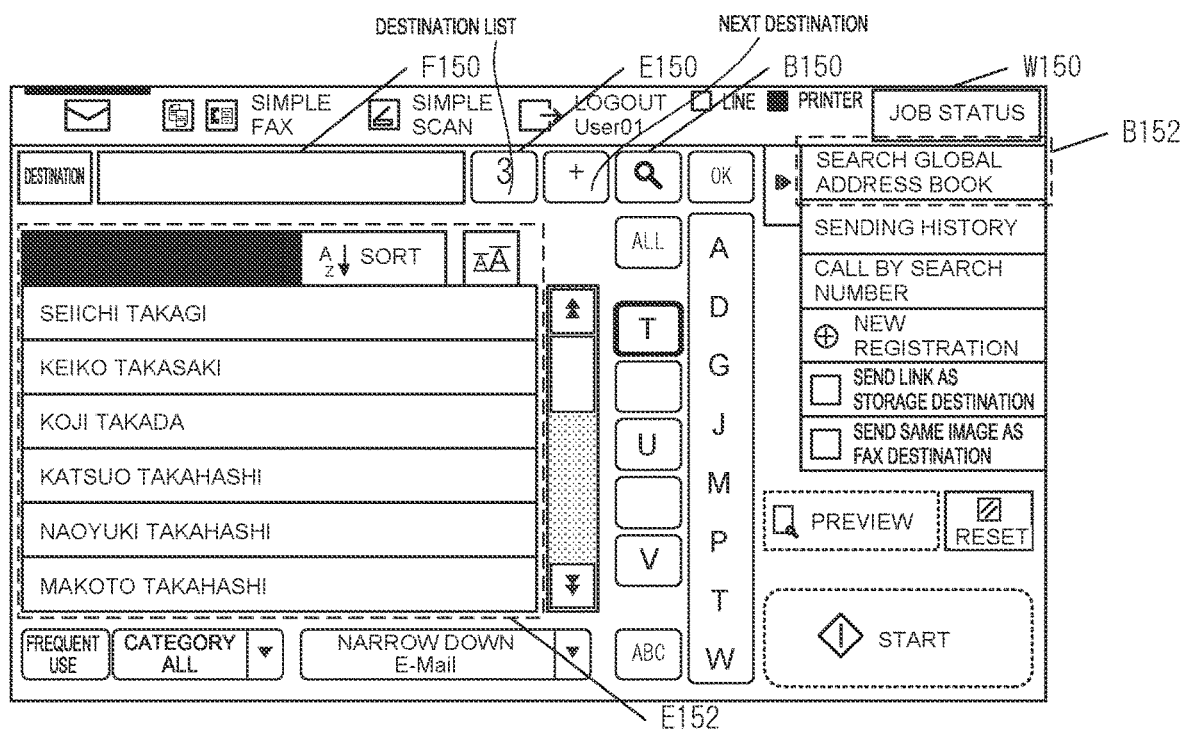

The display screen W150 includes an area E150 displaying the number of already selected destination addresses. As illustrated in FIG. 12B, the e-mail addresses (three addresses) stored in the address information transferred from the terminal device 10 have already been selected as the image sending destination, and therefore the area E150 displays "3", which is the number of selected e-mail addresses.

The list E140 may also be a list from which one or more sets of address information is selectable by the user operation. In this case, the image processing apparatus 20 selects the e-mail addresses stored in the address information selected in the list E140 as the image sending destinations and displays the number of selected e-mail addresses in the area E150.

Furthermore, the user may select the image sending destination based on the address information stored in the image processing apparatus 20 via the display screen W150.

Here, the display screen W150 includes a list E152 displaying the address information (registered address information) previously stored in the address information storage area 264. The user selects one or more sets of address information from the list E152 so as to additionally select the image sending destinations. The image processing apparatus 20 adds the e-mail address stored in the address information selected by the user to the destination address to which the image is to be sent.

The display screen W150 includes a magnifying glass button B150 for displaying the global address book, a button B152 for searching the global address book, and an input area F150 for directly inputting an address.

Figure 13A:
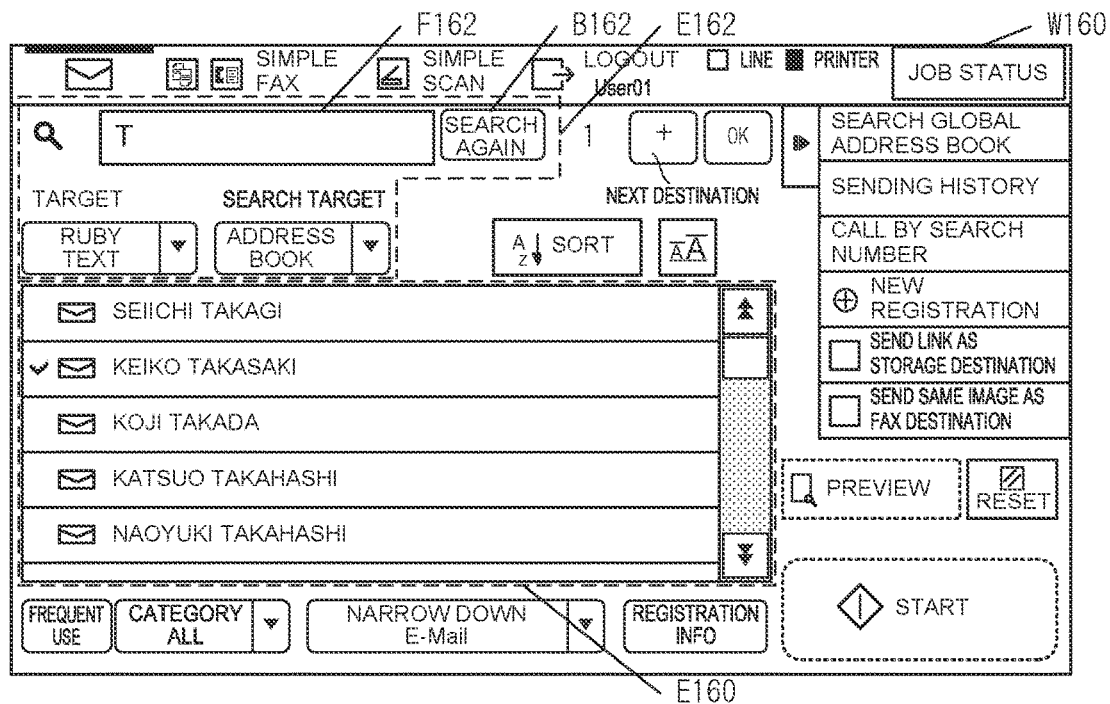
FIGS. 13A and 13B are diagrams illustrating an operation example according to the first embodiment.

FIG. 13A illustrates a display screen W160 displaying the global address book. The display screen W160 includes a list E160 displaying the global address information. The user selects one or more sets of address information from the list E160 so as to additionally select the image sending destinations.

The display screen W160 may also include an area E162 for displaying a button, or the like, which is operated to narrow down the global address information. For example, after inputting a keyword in an input field F162, the user selects a search-again button B162 so that the address information including the keyword input to the input field F162 may be displayed in the list E160. Furthermore, the user selects one or more sets of address information from the address information narrowed down based on the keyword so as to additionally select the image sending destination.

Figure 13B:
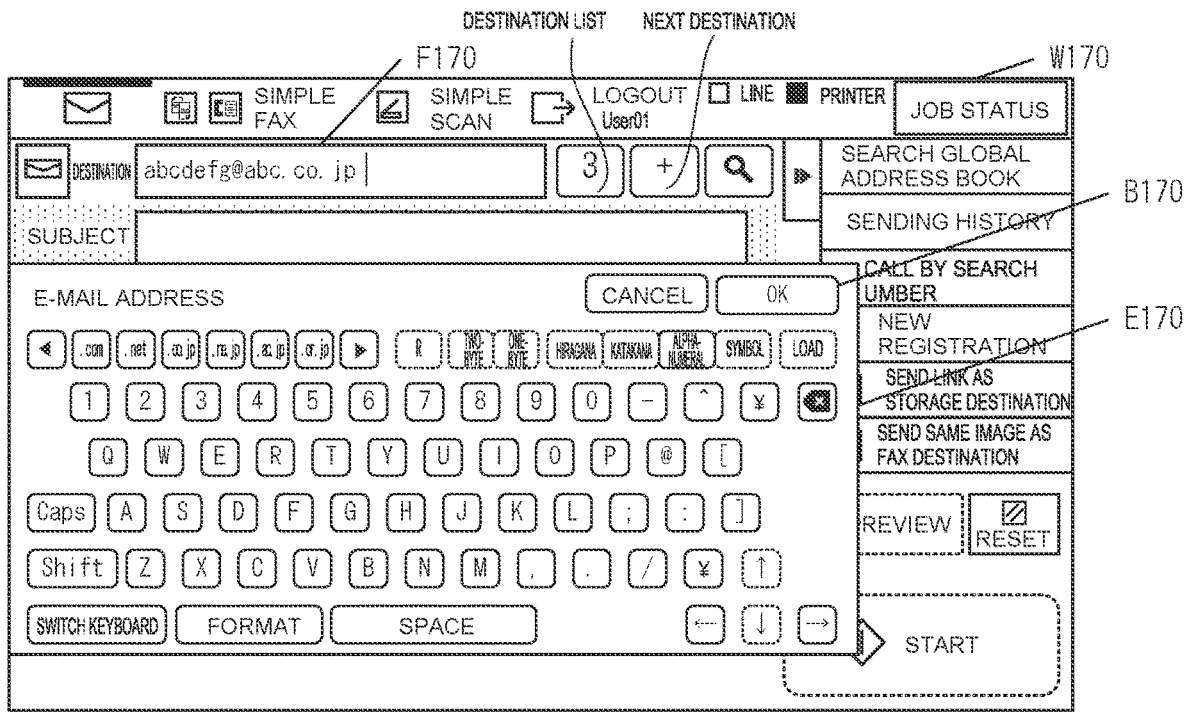

FIG. 13B illustrates an example of a display screen W170 that is displayed on the display 240 when the input area F150 illustrated in FIG. 12B is selected. The display screen W170 includes an area E170 where a software keyboard is displayed. The user selects a button included in the area E170 so as to input characters in an input area F170. The user selects an OK button B170 included in the area E170 so as to add the address input in the input area F170 as the image sending destination.

FIG. 14 illustrates a display screen W180 that is displayed after adding the destinations selected and input via the display screen W150 illustrated in FIG. 12B, the display screen W160 illustrated in FIG. 13A, and the display screen W170 illustrated in FIG. 13B. The display screen W180 is a destination list screen that displays the list of image sending destinations. The display screen W180 includes a list E180 displaying the address information selected as the image sending destination.

As illustrated in FIG. 14, the list E180 includes address information E182 selected from the address information transferred from the terminal device 10 and address information E184 added by operating the image processing apparatus 20 after the address information is transferred from the terminal device 10. By referring to the list E180, the user may check whether the address information selected from the address information transferred from the terminal device 10 and the address information added via the image processing apparatus 20 are properly added as image sending destinations. The display screen W180 may also display a button, or the like, to perform the operation to delete the address information from the list E180. The desired address information is selected from the list E180 and a deletion button is operated so that the address information may be deleted from the list E180. The display screen W180 may also display a button, or the like, for performing the operation to add the address information to the list E180.

In the description according to the present embodiment, the e-mail address is used as the image sending destination (address), but address information (e.g., facsimile number or IP address) other than the e-mail address may also be used as long as the information may specify the image sending destination.

As described above, according to the present embodiment, after the address information stored in the terminal device such as a smartphone is transferred to the image processing apparatus, the user continuously operates the image processing apparatus so as to flexibly specify the image sending destination (address). That is, the user may add as the sending destination or delete the destination selected from one or more sets of address information among the address information transferred from the terminal device and the address information and the global address information stored in the image processing apparatus or the directly input destination. According to the present embodiment, the user may flexibly select the image sending destination in the image processing apparatus without installing a specific app on the smartphone.

2. Second Embodiment

Next, a second embodiment will be described. According to the second embodiment, the terminal device 10 transfers none of the address information stored in the terminal device 10 to the image processing apparatus 20.

According to the present embodiment, at S1008 in FIG. 7 according to the first embodiment, the controller 100 displays the address information stored in the address information storage area 162 on the display 140 in a display form (e.g., list form) so as to be selected by the user.

The controller 100 sends one or more sets of address information selected by the user at S1008 to the image processing apparatus 20 at S1010. This allows the terminal device 10 to selectively transfer the address information to the image processing apparatus 20.

The image processing apparatus 20 executes the address selection process and the image sending process based on the address information selectively transferred by the terminal device 10. The address selection process and the image sending process according to the second embodiment are the same as the process described in the first embodiment.

According to the present embodiment, the user may selectively transfer the address information from the terminal device to the image processing apparatus 20 and thus limit the addresses to be transferred to the image processing apparatus 20. This allows the user to avoid sending unnecessary information from the terminal device 10 to the image processing apparatus 20 and reduce the time needed to transfer the address information.

3. Third Embodiment

Next, a third embodiment will be described. According to the third embodiment, the user may select whether to store the address information transferred from the terminal device 10 after the image sending job is executed. The present embodiment is applicable to both the first embodiment and the second embodiment. According to the present embodiment, FIG. 9 in the first embodiment is replaced with FIG. 16. The same process as that in the first embodiment is denoted by the same reference numeral, and the description is omitted.

The image processing apparatus 20 according to the present embodiment further has a user authentication function. It is assumed that the image processing apparatus 20 according to the present embodiment allows the user (e.g., the administrator of the image processing apparatus 20) to selectively enable or disable the user authentication function.

When the user authentication function is enabled, the image processing apparatus 20 authenticates the user and then allows the authenticated user to use a predetermined function. The user authentication may use any commonly used method. For example, the method may also be such that the storage 260 stores authentication information including login names and passwords and, when the login name and the password input by the user match the login name and the password included in any authentication information, the user is authenticated. The method for authenticating the user by using an authentication server may also be used, or an authentication method using biometric authentication or an authentication card may also be used.

FIG. 15 illustrates an example of a data structure of the sending history information stored in the sending history information storage area 266 according to the present embodiment. As illustrated in FIG. 15, the sending history information according to the present embodiment stores the login name (e.g., "user1") for identifying the user who has performed the image sending operation, the destination (e.g., "Makoto Takahashi") indicating the name of the user as the destination (sending destination) to which the image is to be sent, the e-mail address (e.g., "makoto.takahashi@example.com") of the user as the image sending destination, the sending date and time of the image (e.g., "Jan. 15, 2021, 19:02:21"), and the transfer flag (e.g., "Yes") indicating whether the e-mail address is information transferred from the terminal device 10.

As illustrated in FIG. 15, the transfer flag stores information of either "Yes" or "No". It is appropriate as long as the transfer flag stores information that may distinguish whether the e-mail address of the user as the image sending destination is information transferred from the terminal device 10. Therefore, the transfer flag may store predetermined information when the e-mail address of the user as the image sending destination is information transferred from the terminal device 10 and store no information when it is not information transferred from the terminal device 10.

Furthermore, the image processing apparatus 20 according to the present embodiment may set any of the following two methods to handle the address information transferred from the terminal device 10.

(A) Confirm with the user as to whether to store the address information when the image is sent.

(B) Delete all when the image is sent.

Here, when (B) is selected to handle the address information transferred from the terminal device 10, the controller 200 of the image processing apparatus 20 performs the process described in the first embodiment and the second embodiment as the image sending process. Specifically, the controller 200 deletes the address information, received from the terminal device 10, from the storage 260 using, as a trigger, the user's job start instruction (for example, the selection of the button for executing the job). The controller 100 may also delete the address information, received from the terminal device 10, from the storage 260 after the image sending job is executed.

Figure 16:
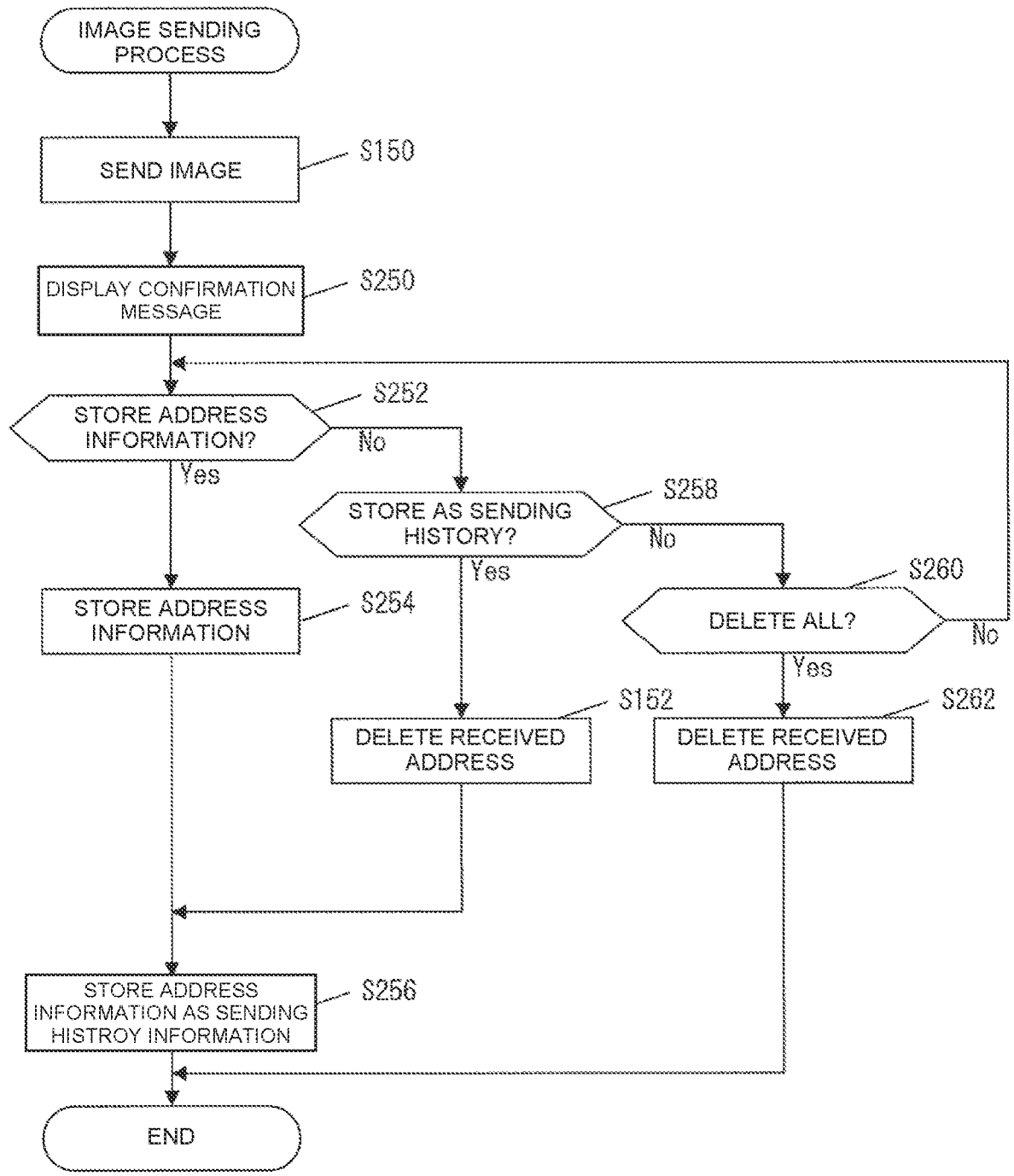
FIG. 16 is a flowchart illustrating a flow of an image sending process according to the third embodiment.

On the other hand, when (A) is selected to handle the address information transferred from the terminal device 10, the controller 200 of the image processing apparatus 20 performs the process illustrated in FIG. 16 as the image sending process.

As the image sending process to confirm with the user as to whether to store the address information when the image is sent, first, the controller 200 executes the image sending job at Step S150 and then displays a confirmation message on the display 240 (Step S250).

The confirmation message is a message to confirm with the user as to how the address information transferred from the terminal device 10 is to be stored. According to the present embodiment, the controller 200 prompts the user to select the method for storing the address information transferred from the terminal device 10 from the following three methods.

(a) Store as the address information and the sending history information (b) Store only as the sending history information (c) Store as neither the address information nor the sending history information (delete all)

This allows the user to select, via the confirmation message, whether to register the address information transferred from the terminal device 10 with the address book of the image processing apparatus 20 or whether to save it as the sending history.

Subsequently, the controller 200 determines whether the user has selected to store the address information transferred from the terminal device 10 in the image processing apparatus 20 (Step S252).

When it is determined that the operation has been performed to store the address information transferred from the terminal device 10 in the image processing apparatus 20, the controller 200 stores the address information transferred from the terminal device 10 in the address information storage area 264 (Step S252; Yes→Step S254). The controller 200 may also convert the address information transferred from the terminal device 10 into address information that may be stored in the address information storage area 264 and then store the converted address information in the address information storage area 264.

Subsequently, the controller 200 stores, as the sending history information, the addresses selected at Steps S104, S110, and S118 and the address (e.g., e-mail address) input at Step S122 in FIG. 8 (Step S256).

The process at Step S256 is the same as the process at Step S154 in the first embodiment. According to the present embodiment, the controller 200 further executes the following process.
  (a) Set the transfer flag in the sending history information to "Yes" when the address information included in the sending history information is the address information received from the terminal device 10.
  (b) Set the transfer flag in the sending history information to "No" when the address information included in the sending history information is the address information previously stored in the image processing apparatus 20.

As described above, the controller 200 changes the information of the transfer flag stored in the sending history information so as to distinguish, based on the transfer flag, whether the e-mail address included in the sending history information is based on the address information transferred from the terminal device 10.

During the process at Step S254, the controller 200 stores the address information transferred from the terminal device 10 in the address information storage area 264 of the image processing apparatus 20. Furthermore, during the process at Step S256, the controller 200 stores, in the sending history information storage area 266, the address information corresponding to the image sending destination among the address information transferred from the terminal device 10.

Conversely, when it is determined that the operation has not been performed to store the address information transferred from the terminal device 10 in the image processing apparatus 20, the controller 200 determines whether the user has selected to store the address information as the sending history information (Step S252; No→Step S258).

When it is determined that the operation has been performed to store it as the sending history information, the controller 200 deletes the address information stored at Step S100 of FIG. 8 (the address information received from the terminal device 10) from the storage 260 (S258; Yes→Step S152). Furthermore, the controller 200 stores the address information as the sending history information (Step S256). The process at Step S256 may be performed before the process at Step S152.

By the process described above, the controller 200 stores, in the sending history information storage area 266, the address information corresponding to the image sending destination among the address information transferred from the terminal device 10. On the other hand, the controller 200 does not store the address information transferred from the terminal device 10 in the address information storage area 264 of the image processing apparatus 20.

At Step S258, when it is determined that the operation has not been performed to store the address information transferred from the terminal device 10 as the sending history information, the controller 200 determines whether the operation has been performed to delete all the address information received from the terminal device 10 (Step S258; No→Step S260). When it is determined that the operation has been performed to delete all the address information, the controller 200 deletes the address information stored at Step S100 of FIG. 8 (the address information received from the terminal device 10) from the storage 260 (Step S260; Yes→Step S262). The process at Step S262 is the same as the process at Step S152.

After the process at Step S262, the controller 200 omits (skips) the process at Step S256. Accordingly, the controller 200 does not store the address information corresponding to the image sending destination in the sending history information storage area 266. Instead of omitting the process at Step S256, the controller 200 may also store, in the sending history information storage area 266, only the sending history information regarding the address information previously stored in the image processing apparatus 20. In this case, among the address information corresponding to the image sending destination, the image processing apparatus 20 does not store the sending history information corresponding to the address information transferred from the terminal device 10 but stores only the sending history information corresponding to the address information previously stored in the image processing apparatus 20.

When the user authentication function is disabled, the controller 200 may also, at Step S256, perform the operation to store null information as the information of the login name in the sending history information (i.e., not store predetermined information as the login name).

Figure 17:
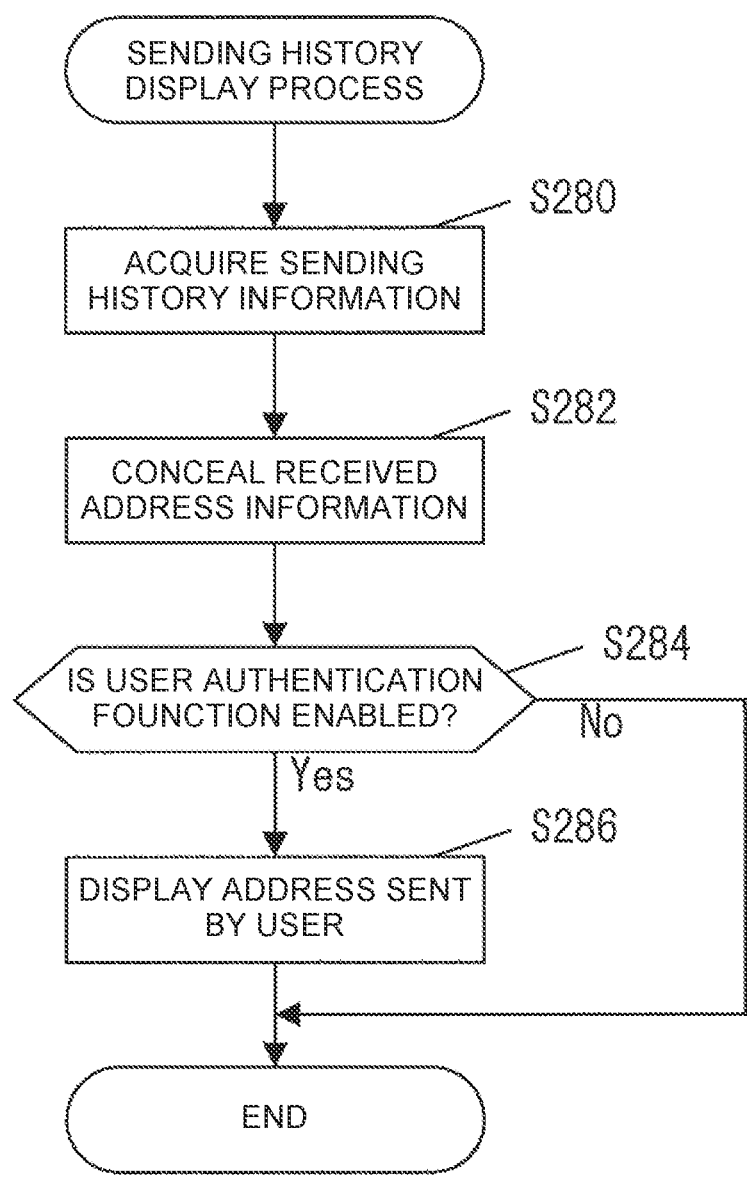
FIG. 17 is a flowchart illustrating a flow of a sending history display process according to the third embodiment.

Next, the flow of a sending history display process will be described with reference to FIG. 17. The sending history display process is executed when the user has performed the operation to display the sending history (for example, the operation to select a button for displaying the sending history).

First, the controller 200 acquires the sending history information stored in the sending history information storage area 266 (Step S280). Subsequently, the controller 200 (a history information display) conceals the address information received from the terminal device 10 and then displays the sending history information acquired at Step S280 on the display 240 (Step S282).

For example, the controller 200 displays the sending history information in list form on the display 240. Here, for the sending history information having the transfer flag of "Yes", the controller 200 hides the e-mail address included in the sending history information or replaces the e-mail address with predetermined symbols (e.g., asterisk) to display as hidden characters. The controller 200 may also delete the sending history information having the transfer flag of "Yes" from the list displaying the sending history information.

Subsequently, the controller 200 determines whether the user authentication function is enabled (Step S284). When the user authentication function is enabled, the controller 200 displays the address information transferred from the terminal device 10 by the user authenticated by the user authentication function on the display 240 (Step S284; Yes→Step S286).

For example, the controller 200 determines, for each list item, whether the login name stored in the sending history information matches the login name of the user authenticated by the user authentication function in the sending history information displayed in list form at Step S282. Then, the controller 200 displays the e-mail address included in the sending history information where the login name stored in the sending history information matches the login name of the user authenticated by the user authentication function among the sending history information having the transfer flag "Yes" stored in the sending history information. That is, when the address information is received from the terminal device 10 while the user authenticated by the user authentication function is operating the image processing apparatus 20, the controller 200 determines that the address information is the information transferred by the user who has operated the image processing apparatus 20.

Figure 18:
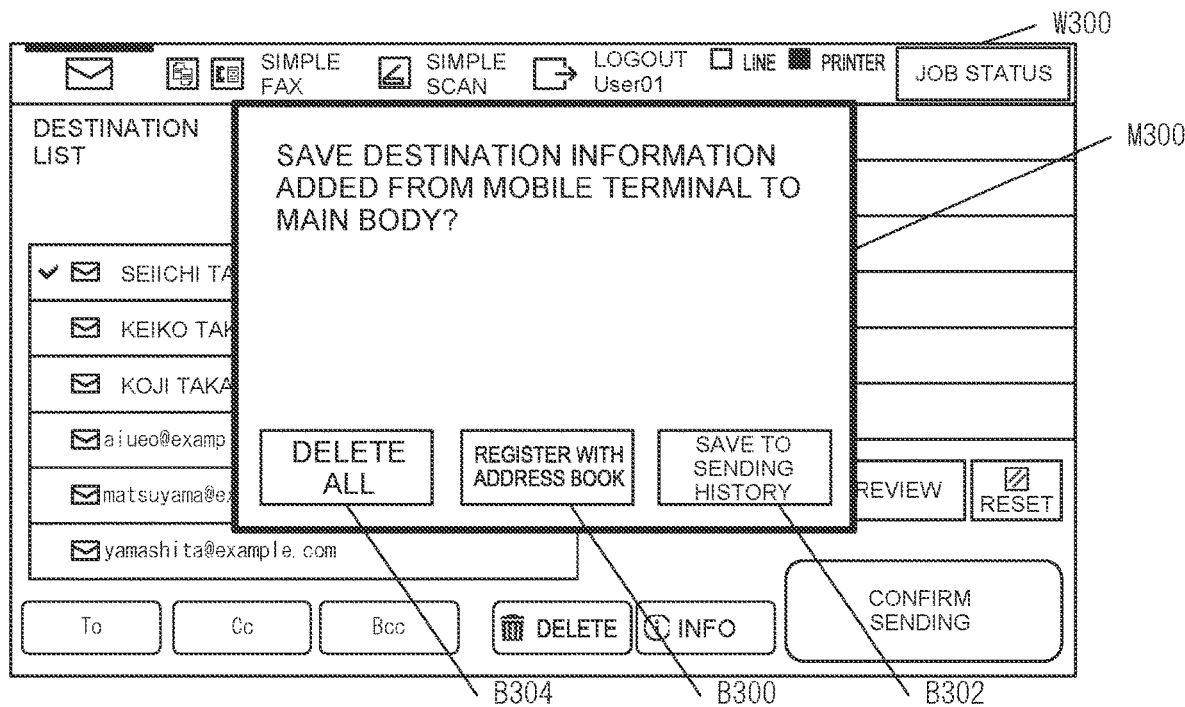
FIG. 18 is a diagram illustrating an operation example according to the third embodiment.

Next, with reference to FIGS. 18, 19A, and 19B, an operation example according to the present embodiment will be described. FIG. 18 illustrates an example of a display screen W300 when a confirmation message M300 is displayed.

The confirmation message M300 includes the following three buttons as buttons regarding the address information transferred from the terminal device 10.

(A) A button B300 for storing the address information as the address information of the image processing apparatus 20

(B) A button B302 for storing the address information as the sending history information (C) A button B304 for deleting the address information The user selects any of the buttons B300, B302, and B304 so as to make a selection as to whether to store the address information transferred from the terminal device 10.

Figure 19A:
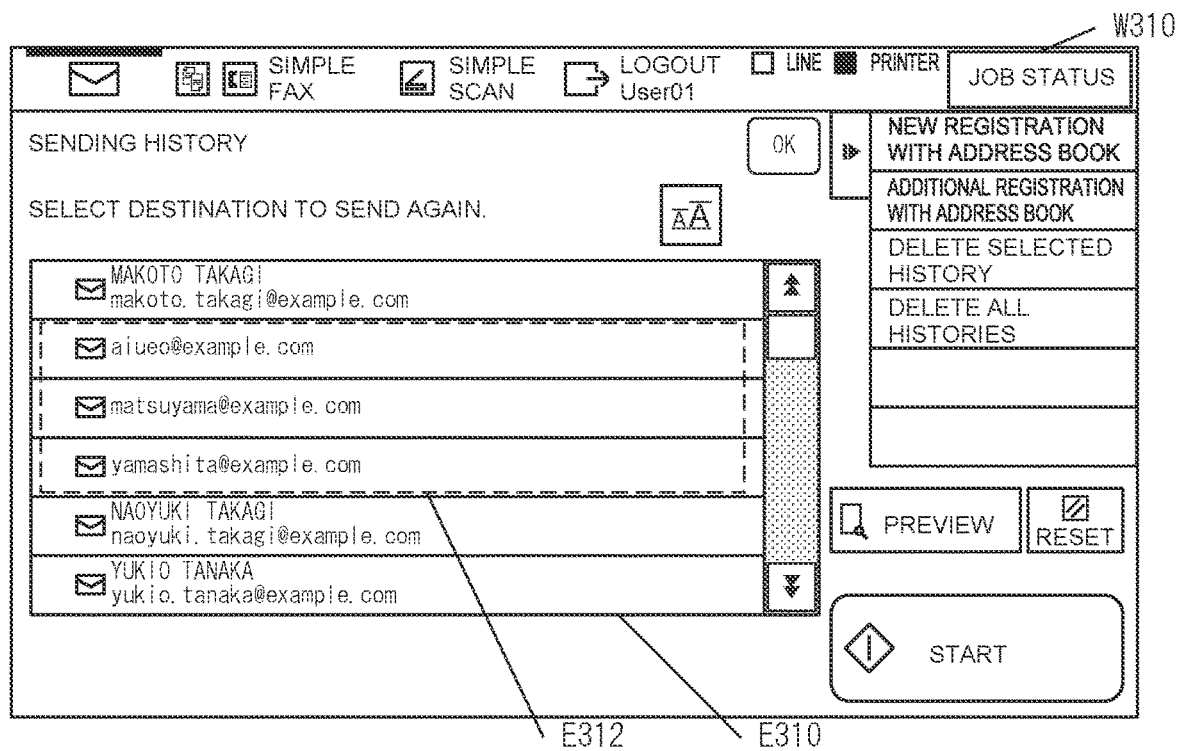
FIGS. 19A and 19B are diagrams illustrating an operation example according to the third embodiment.
Figure 19B:
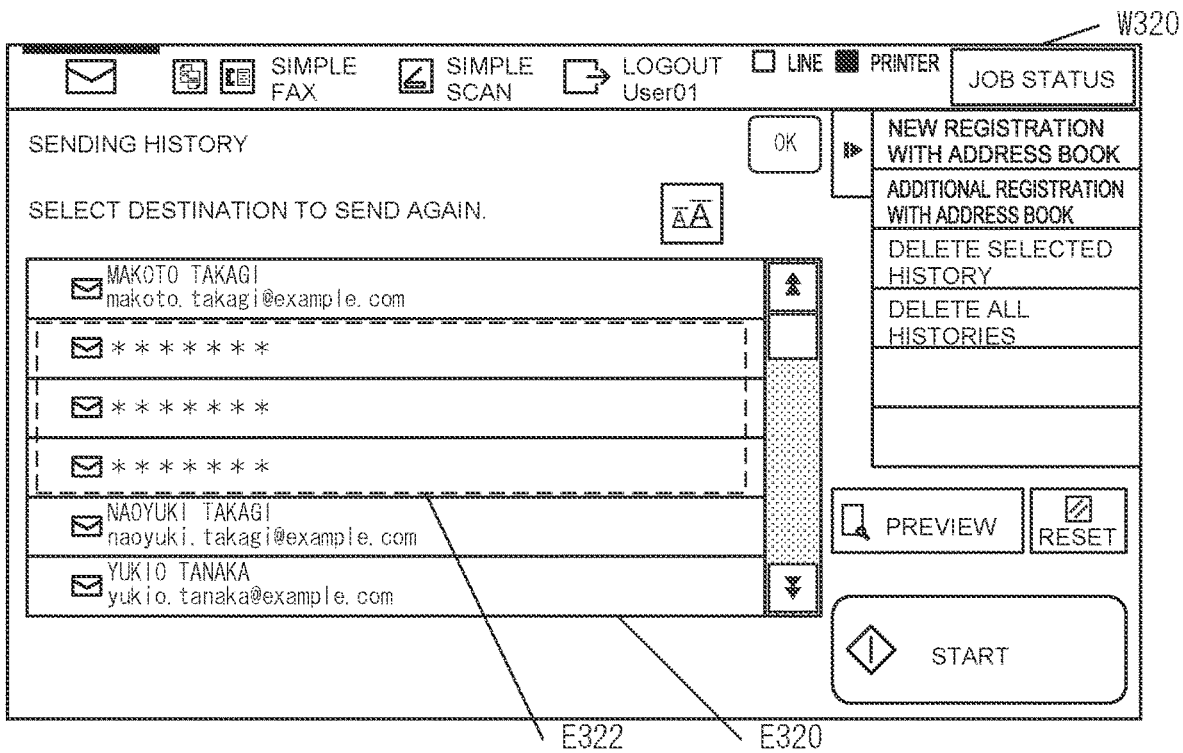

FIGS. 19A and 19B are diagrams illustrating the display screen (sending history screen) displaying the sending history information. FIG. 19A is a diagram illustrating an example of a sending history screen W310 when the user authentication function is enabled. The sending history screen W310 includes a list E310 displaying the sending history information.

Here, in the list E310, the items included in an area E312 are items based on the address information transferred from the terminal device 10. Here, when the item included in the area E312 is an item of the sending history information based on the address information transferred by the user authenticated by the user authentication function, the address included in the sending history information is displayed without being concealed as illustrated in FIG. 19A. Therefore, the user authenticated by the user authentication function may use again the address transferred from the terminal device 10 to the image processing apparatus 20 in the past.

FIG. 19B is a diagram illustrating an example of a sending history screen W320 when the user authentication function is disabled. The sending history screen W320 includes a list E320 displaying the sending history information.

Here, in the list E320, the items included in an area E322 are items based on the address information transferred from the terminal device 10. When the user authentication function is disabled, the address included in the sending history information is concealed on display as illustrated in FIG. 19B. In this case, the user of the image processing apparatus 20 is not allowed to use again the address included in the address information transferred from the terminal device 10.

The address information transferred from the terminal device 10 may also be concealed as illustrated in FIG. 19B when the user who has transferred the address information from the terminal device 10 is different from the user authenticated by the user authentication function even though the user authentication function is enabled.

With the image processing apparatus according to the present embodiment, it is possible to make a selection as to whether to store the address information transferred from the terminal device or whether to save it as the sending history information. This allows the user to flexibly make a selection as to whether to save the address information transferred from the terminal device 10 to the image processing apparatus 20 to the address book or the sending history of the image processing apparatus 20 or not to save it to the image processing apparatus 20 at all. The image processing apparatus according to the present embodiment may conceal the address information transferred from the terminal device based on a status, such as whether the user authentication function is enabled, or the user authenticated by the user authentication function. Thus, it is possible to increase the security for the address information transferred from the terminal device.

4. Modification Example

The present invention is not limited to the above-described embodiments, and various modifications may be made. That is, the technical scope of the present invention also includes an embodiment obtained by combining technical measures appropriately changed without departing from the gist of the present invention.

Although some of the above-described embodiments are described separately for convenience of explanation, it is obvious that they may be combined and implemented within a technically possible range.

A program operated in each device according to the embodiment is a program that controls the CPU, or the like (a program that causes a computer to function) so as to perform the function of the above-described embodiment. The information handled by these devices is temporarily stored in a temporary storage device (e.g., RAM) during processing and then stored in various storage devices such as a read only memory (ROM) and an HDD to be read, corrected, and written by the CPU as needed.

Here, a recording medium that stores the program may be any of a semiconductor medium (e.g., a ROM and a non-volatile memory card), an optical recording medium/magneto-optical recording medium (e.g., a digital versatile disc (DVD), a magneto optical disc (MO), a Mini Disc (MD), a compact disc (CD), and a Blu-ray Disc (BD) (registered trademark)), a magnetic recording medium (e.g., a magnetic tape and a flexible disk), etc. Not only the function of the above-described embodiment is performed by executing the loaded program, but also the function of the present invention may also be performed by processing in cooperation with an operating system, other application programs, or the like, based on an instruction of the program.

When the program is to be distributed to the market, the program may be stored in a portable recording medium for distribution or transferred to a server computer connected via a network such as the Internet. In this case, it is obvious that the present invention also includes a storage device of the server computer.

What is claimed is:

1. An image processing apparatus comprising:
one or more memories storing one or more address information relating to a transmission destination of data;
one or more controllers;
a display; and
a communication device transmitting data to the transmission destination,
wherein
the one or more controllers set one or more first addresses and one or more second addresses as the transmission destination of the data, and
the one or more first addresses are one or more addresses selected from one or more address information received from a terminal device by using a short-range wireless communication, wherein
the one or more second addresses are at least one of; one or more addresses selected from the one or more address information stored in the one or more memories, one or more addresses selected from one or more address information stored outside of the image processing apparatus, and one or more addresses directly inputted by a user,
the one or more controllers transmit the data to the one or more first addresses and the one or more second addresses by the communication device, and
after having instructed to perform the transmission of the data, the one or more controllers display on the display a confirmation screen inquiring whether the one or more first addresses that are set as the transmission destination of the data are deleted, or are stored as the one or more address information stored in the one or more memories, or are stored as history information stored in the one or more memories.

2. The image processing apparatus according to claim 1, wherein the one or more controllers perform an editing of the one or more first addresses and the one or more second addresses set as the transmission destination of the data based on instructions of a user.

3. The image processing apparatus according to claim 1, wherein the one or more controllers store, in the one or more memories, the one or more address information received from the terminal device, and after having instructed to perform the transmission of the data, the one or more controllers are capable of deleting, from the one or more memories, the one or more address information received from the terminal device, or setting whether to display the confirmation screen on the display.

4. The image processing apparatus according to claim 1, wherein after having instructed to perform the transmission of the data, the one or more controllers store, in the one or more memories, the one or more first addresses that are set as the transmission destination of the data as the history information.

5. The image processing apparatus according to claim 4, wherein
the one or more controllers, when displaying on the display the one or more first addresses stored as the history information, display by hiding the one or more first addresses.

6. The image processing apparatus according to claim 5, wherein the one or more controllers, when a user authentication function is disabled, display by hiding the one or more first addresses stored as the history information.

7. The image processing apparatus according to claim 1, wherein the one or more controllers:
display, on the display, a list screen including a first area that includes the one or more first addresses and a second area that includes the one or more second addresses, and
transmit the data to the one or more first addresses and the one or more second addresses.

8. A method of controlling of an image processing apparatus, the method comprising:
storing one or more address information relating to a transmission destination of data;
setting one or more first addresses and one or more second addresses as the transmission destination of the data;
transmitting the data to the transmission destination,
wherein
the one or more first addresses are one or more addresses selected from one or more address information received from a terminal device by using a short-range wireless communication,
wherein
the one or more second addresses are at least one of: one or more addresses selected from the one or more address information stored in one or more memories, one or more addresses selected from one or more address information stored outside of the image processing apparatus, and one or more addresses directly inputted by a user;
transmitting the data to the one or more first addresses and the one or more second addresses; and
after having instructed to perform the transmission of the data, displaying on the display a confirmation screen inquiring whether the one or more first addresses that are set as the transmission destination of the data are deleted, or are stored as the one or more address information stored in the one or more memories, or are stored as history information stored in the one or more memories.

* * * * *